US011200536B2

United States Patent
Mauldin et al.

(10) Patent No.: US 11,200,536 B2
(45) Date of Patent: Dec. 14, 2021

(54) SYSTEMS AND METHODS FOR PREDICTIVELY MANAGING COLLECTIONS OF ITEMS

(71) Applicant: Texas Tech University System, Lubbock, TX (US)

(72) Inventors: Weston Mauldin, Lubbock, TX (US); Ryan Litsey, Lubbock, TX (US); Scott Luker, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 137 days.

(21) Appl. No.: 16/575,401

(22) Filed: Sep. 19, 2019

(65) Prior Publication Data
US 2020/0334633 A1    Oct. 22, 2020

Related U.S. Application Data

(60) Provisional application No. 62/728,609, filed on Sep. 7, 2018.

(51) Int. Cl.
*G06Q 10/08*    (2012.01)
*G06N 20/00*    (2019.01)

(52) U.S. Cl.
CPC ......... *G06Q 10/0875* (2013.01); *G06N 20/00* (2019.01)

(58) Field of Classification Search
CPC .... G06Q 10/0875; G06Q 10/08; G06N 20/00; G06K 9/6218
USPC ........................................................ 705/29
See application file for complete search history.

(56) References Cited

U.S. PATENT DOCUMENTS

| 5,895,474 | A  | * | 4/1999 | Maarek ................... G06F 16/34 715/210 |
| 7,027,508 | B2 | * | 4/2006 | Shibata .............. G06K 9/00711 375/240.08 |
| 8,620,819 | B2 | * | 12/2013 | Walker .................... G06F 21/10 705/59 |
| 9,442,935 | B2 | * | 9/2016 | Lehtiniemi ......... G06F 16/4387 |
| 9,547,698 | B2 | * | 1/2017 | Jain ..................... G06Q 30/0255 |
| 9,646,262 | B2 |   | 5/2017 | Phillipps et al. |
| 9,767,208 | B1 | * | 9/2017 | Chow .................. G06F 16/9535 |
| 10,018,703 | B2 | * | 7/2018 | Bernal .................... G06T 7/223 |

(Continued)

OTHER PUBLICATIONS

Ryan Litsey et al., Knowing What the Patron Wants: Using Predictive Analytics to Transform Library Decision Making, The Journal of Academic Librarianship, 44 (2018) pp. 140-144, dated Sep. 23, 2017, https://www.sciencedirect.com/science/article/abs/pii/S0099133317301866.

(Continued)

*Primary Examiner* — Andrew Joseph Rudy
(74) *Attorney, Agent, or Firm* — Loza; Richard H. Krukar

(57) ABSTRACT

Libraries are collections of books, periodicals, and other items that can be read in situ, checked out by patrons, and shared with other libraries. Collections are more useful when the items in the collection reflect user interests. Cluster analysis of the collection can be juxtaposed with cluster analysis of items taken from, borrowed from, or requested from the collection. The juxtaposition reveals differences between the collection and the user's desired collection. The collection can also be adapted to meet expected future needs by predicting future user needs based on past user behavior.

20 Claims, 17 Drawing Sheets

(56) References Cited

U.S. PATENT DOCUMENTS

| | | | |
|---|---|---|---|
| 10,032,282 B2* | 7/2018 | Cobb | G06T 7/20 |
| 10,140,372 B2* | 11/2018 | Popp | G06F 16/9535 |
| 10,565,771 B2* | 2/2020 | Song | G06K 9/6256 |
| 2018/0028079 A1* | 2/2018 | Gurevich | G06T 7/557 |
| 2019/0362018 A1* | 11/2019 | Salomon | G06F 16/26 |

OTHER PUBLICATIONS

Bruce E. Massis, "Using predictive analytics in the library", New Library World, vol. 113, Issue: 9/10, pp. 491-494, dated Oct. 25, 2017, https://www.emerald.com/insight/content/doi/10.1108/03074801211273957/full/html.

* cited by examiner

| Third Database 1001 | | |
|---|---|---|
| Control Numbers 1002 | Property 1 1003 | Property 2 1004 |
| Control Number 1 1005 | Control Number 1, Property 1 Value 1006 | Control Number 1, Property 1 Value 1007 |
| Control Number 2 1008 | Control Number 2, Property 1 Value 1009 | Control Number 2, Property 1 Value 1010 |
| ⋮ | ⋮ | ⋮ |
| Control Number S 1011 | Control Number S, Property 1 Value 1012 | Control Number S, Property 1 Value 1013 |

*Fig. 10*

| OCLCNum | Genre1 | Genre2 | Genre3 | Genre4 | Genre5 | Genre6 | Subject1 | Subject2 | Subject3 | Subject4 | Subject5 | Subject6 | Subject7 | Subject8 |
|---|---|---|---|---|---|---|---|---|---|---|---|---|---|---|
| 509 | - | - | - | - | - | - | Antennas (Electronics) | Antennas (Électronique) | - | - | - | - | - | - |
| 651 | - | - | - | - | - | - | Imperialism | Impérialisme | Politics and government | - | - | - | - | - |
| 1210 | Young adult fiction | Fantasy | Fantasy fiction | Fiction | Juvenile works | Young adult works | Wizards | Magic | Fantasy | - | - | - | - | - |
| 1415 | - | - | - | - | - | - | Mathematical optimization | Maxima and minima | Optimisation mathématique | Maxima et minima | Optimaliseren | Wiskundige methoden | Optimierung | Nichtlineare Optimierung |
| 1465 | - | - | - | - | - | - | System theory | Systèmes, Théorie des | Onderzoeksmethoden | Sociale wetenschappen | - | - | - | - |
| 2073 | - | - | - | - | - | - | Soil mechanics | Soil Mechanics | - | - | - | - | - | - |
| 2090 | - | - | - | - | - | - | Ontology | Knowledge, Theory of | Metafysica | Philosophie | Wahrnehmung | Metafisica (Teologia/Ontologia) | - | - |
| 2266 | Criticism, interpretation, etc | History | - | - | - | - | Women and literature | English fiction | Sisters | Literature | - | - | - | - |
| 2746 | Exhibition catalogs | - | - | - | - | - | Historia Antiga (Povos) | - | - | - | - | - | - | - |
| 2845 | History | Sources | - | - | - | - | Railroad stations | Railroads | - | - | - | - | - | - |
| 3014 | - | - | - | - | - | - | NAVO | Kollektive Sicherheit | Militärische Bedrohung | Ost-West-Konflikt | - | - | - | - |
| 3144 | - | - | - | - | - | - | Mineralogy | Geochemistry | Petrology | Mineralogie | Geochimie | Petrologie | - | - |
| 4027 | - | - | - | - | - | - | | | | | | | | |

Fig. 11. Book Genres and Subjects

| OCLC Number | Format | Subject | Shared By | Title | Author | Publication Date | Edition | Publisher | ISSN | ISBN | LCCN | Language | Physical Description | Series Statement | Genre | Audience | URL | LC Call Number | Dewey Call Number | NLM Call Number | Local Call Number | Location | Number of Circulations | Last Circulated Date |
|---|---|---|---|---|---|---|---|---|---|---|---|---|---|---|---|---|---|---|---|---|---|---|---|---|
| 2 | Book, Print | Geomorphology | | Mudlumps at the mouth of South Pass, Mississippi River; sedimentology, paleontology, structure, origin, and relation to deltaic processes. | Morgan, James P. 1919-1995. (James Plummer) | 1983 | | Louisiana State University Press, | | | 63032258 | English | xxi, 190 pages | Louisiana State University studies. Coastal studies series; no. 10. | | Adult | null | GB475.L6 | 512 | | | | 0 | 00:00.0 |
| 17 | Book, Print | Sociology, General & Theoretical | | Society without the father; a contribution to social psychology. | Mitscherlich, Alexander, 1908-1982. | 1969 | 1st American ed.] | Harcourt Brace & World | | | 65019066 | English | xi, 329 pages | | | Adult | null | HM251 | 301.1 | HM251 | | | 0 | 00:00.0 |
| 22 | Book, Print | State & Local History - The West | | Western America in 1846-1847; the original travel diary of Lieutenant J.W. Abert, who mapped New Mexico for the United States Army. | Abert, J. W. 1820-1897 (James William), | 1966 | | J. Howell, | | | 65027416 | English | 115 pages | | Diaries | Adult | null | F590 | 917.59/04/2 | | | | 0 | 00:00.0 |
| 26 | Book, Print | Superintendent of Documents Publications | | Testimony of Rev. James H. Robinson. Hearing, Eighty-eighth Congress, second session, May 5, 1964. | United States.Congress. | 1964 | | U.S. Govt. Print. Off., | | | 65036040 | English | v. 1925-1973. v pages | | | Adult | null | KF27 | 1295.4/.9073 | | | | 0 | 00:00.0 |

Fig. 12. Sample of Collection Data

| Genre |
| --- |
| Abstract films |
| Abstract animation films |
| Abstract live action films |
| Concrete films |
| Nonobjective films |
| Nonrepresentational films |
| Action and adventure films |
| Action-adventure films |
| Action films |
| Action movies |
| Adventure and action films |
| Adventure films |
| Adventure movies |
| Administrative decisions |
| Administrative agency decisions |
| Administrative opinions |
| Administrative rulings (Decisions) |
| Agency decisions |
| Decisions, Administrative |
| Opinions, Administrative |
| Regulatory agency decisions |
| Rulings, Administrative (Decisions) |
| Aerial views |
| Bird's-eye views |
| Overhead views |
| Views, Aerial |
| Views, Birds-eye |
| Alternate takes (Sound recordings) |
| Takes, Alternate (Sound recordings) |
| Andy Hardy films |
| Animal films |
| Anthology films |
| Anthologies (Motion pictures) |
| Composite films |
| Episode films |
| Episodic films |
| Omnibus films |
| Portmanteau films |
| Sketch films |

Fig. 13. List of genres

| Transaction Number | Transaction Status | LoanTitle | TransactionDate | Request Type | Process Type | OCLC Number | ChangedTo |
|---|---|---|---|---|---|---|---|
| 4 | Request Finished | Natural landscaping : gardening with nature to create a backyard paradise / | 7/13/2006 16:27 | Loan | TestBorrow | 34474219 | Submitted by Customer |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Document Delivery Processing |
| 4 | Request Finished | Natural landscaping : gardening with nature to create a backyard paradise / | 7/13/2006 16:27 | Loan | TestBorrow | 34474219 | In DD Stacks Searching |
| 4 | Request Finished | Natural landscaping : gardening with nature to create a backyard paradise / | 7/13/2006 16:27 | Loan | TestBorrow | 34474219 | Item Found |
| 4 | Request Finished | Natural landscaping : gardening with nature to create a backyard paradise / | 7/13/2006 16:27 | Loan | TestBorrow | 34474219 | Awaiting Doc Del Customer Contact |
| 4 | Request Finished | Natural landscaping : gardening with nature to create a backyard paradise / | 7/13/2006 16:27 | Loan | TestBorrow | 34474219 | Doc Del Customer Notified via E-Mail |
| 4 | Request Finished | Natural landscaping : gardening with nature to create a backyard paradise / | 7/13/2006 16:27 | Loan | TestBorrow | 34474219 | Request Finished |
| 4 | Request Finished | Natural landscaping : gardening with nature to create a backyard paradise / | 7/13/2006 16:27 | Loan | TestBorrow | 34474219 | Awaiting Document Delivery Processing |
| 4 | Request Finished | Natural landscaping : gardening with nature to create a backyard paradise / | 7/13/2006 16:27 | Loan | TestBorrow | 34474219 | In DD Stacks Searching |
| 4 | Request Finished | Natural landscaping : gardening with nature to create a backyard paradise / | 7/13/2006 16:27 | Loan | TestBorrow | 34474219 | Awaiting Document Delivery Processing |
| 4 | Request Finished | Natural landscaping : gardening with nature to create a backyard paradise / | 7/13/2006 16:27 | Loan | TestBorrow | 34474219 | In DD Stacks Searching |
| 4 | Request Finished | Natural landscaping : gardening with nature to create a backyard paradise / | 7/13/2006 16:27 | Loan | TestBorrow | 34474219 | Delivered to Web |
| 4 | Request Finished | Natural landscaping : gardening with nature to create a backyard paradise / | 7/13/2006 16:27 | Loan | TestBorrow | 34474219 | Routed from Document Delivery |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Awaiting Request Processing |
| 4 | Request Finished | Natural landscaping : gardening with nature to create a backyard paradise / | 7/13/2006 16:27 | Loan | TestBorrow | 34474219 | Request in Processing |
| 4 | Request Finished | Natural landscaping : gardening with nature to create a backyard paradise / | 7/13/2006 16:27 | Loan | TestBorrow | 34474219 | Request Sent |
| 4 | Request Finished | Natural landscaping : gardening with nature to create a backyard paradise / | 7/13/2006 16:27 | Loan | TestBorrow | 34474219 | Awaiting Post Receipt Processing |
| 4 | Request Finished | Natural landscaping : gardening with nature to create a backyard paradise / | 7/13/2006 16:27 | Loan | TestBorrow | 34474219 | Awaiting Customer Contact |
| 4 | Request Finished | Natural landscaping : gardening with nature to create a backyard paradise / | 7/13/2006 16:27 | Loan | TestBorrow | 34474219 | Customer Notified via E-Mail |
| 4 | Request Finished | Natural landscaping : gardening with nature to create a backyard paradise / | 7/13/2006 16:27 | Loan | TestBorrow | 34474219 | Checked Out to Customer |
| 4 | Request Finished | Natural landscaping : gardening with nature to create a backyard paradise / | 7/13/2006 16:27 | Loan | TestBorrow | 34474219 | In Transit from Customer |
| 4 | Request Finished | Natural landscaping : gardening with nature to create a backyard paradise / | 7/13/2006 16:27 | Loan | TestBorrow | 34474219 | Item Not Picked Up |
| 4 | Request Finished | Natural landscaping : gardening with nature to create a backyard paradise / | 7/13/2006 16:27 | Loan | TestBorrow | 34474219 | Awaiting Return Label Printing |
| 4 | Request Finished | Natural landscaping : gardening with nature to create a backyard paradise / | 7/13/2006 16:27 | Loan | TestBorrow | 34474219 | Request Finished |

Fig. 14a. Sample of InterLibrary Loan Data

| Transaction Number | Transaction Status | LoanTitle | TransactionDate | Request Type | Process Type | OCLC Number | ChangedTo |
|---|---|---|---|---|---|---|---|
| 7 | Request Finished | Four musical minimalists | 5/15/2006 14:08 | Loan | Doc Del | | Submitted by Customer |
| 7 | Request Finished | Four musical minimalists | 5/15/2006 14:08 | Loan | Doc Del | | Awaiting Request Processing |
| 7 | Request Finished | Four musical minimalists | 5/15/2006 14:08 | Loan | Doc Del | | Request in Processing |
| 7 | Request Finished | Four musical minimalists | 5/15/2006 14:08 | Loan | Doc Del | | Awaiting Request Processing |
| 7 | Request Finished | Four musical minimalists | 5/15/2006 14:08 | Loan | Doc Del | | Request in Processing |
| 7 | Request Finished | Four musical minimalists | 5/15/2006 14:08 | Loan | Doc Del | | Awaiting Request Processing |
| 7 | Request Finished | Four musical minimalists | 5/15/2006 14:08 | Loan | Doc Del | | Request in Processing |
| 7 | Request Finished | Four musical minimalists | 5/15/2006 14:08 | Loan | Doc Del | | Awaiting Document Delivery Processing |
| 7 | Request Finished | Four musical minimalists | 5/15/2006 14:08 | Loan | Doc Del | | In DD Stacks Searching |
| 7 | Request Finished | Four musical minimalists | 5/15/2006 14:08 | Loan | Doc Del | | Item Found |
| 7 | Request Finished | Four musical minimalists | 5/15/2006 14:08 | Loan | Doc Del | | Awaiting Doc Del Customer Contact |
| 7 | Request Finished | Four musical minimalists | 5/15/2006 14:08 | Loan | Doc Del | | Customer Notified via Phone |
| 7 | Request Finished | Four musical minimalists | 5/15/2006 14:08 | Loan | Doc Del | | Request Finished |
| 7 | Request Finished | Four musical minimalists | 5/15/2006 14:08 | Loan | Doc Del | | Awaiting Doc Del Customer Contact |
| 7 | Request Finished | Four musical minimalists | 5/15/2006 14:08 | Loan | Doc Del | | Doc Del Customer Notified via E-Mail |
| 7 | Request Finished | Four musical minimalists | 5/15/2006 14:08 | Loan | Doc Del | | Request Finished |
| 7 | Request Finished | Four musical minimalists | 5/15/2006 14:08 | Loan | Doc Del | | Awaiting Doc Del Customer Contact |
| 7 | Request Finished | Four musical minimalists | 5/15/2006 14:08 | Loan | Doc Del | | Awaiting Document Delivery Processing |
| 7 | Request Finished | Four musical minimalists | 5/15/2006 14:08 | Loan | Doc Del | | In DD Stacks Searching |
| 7 | Request Finished | Four musical minimalists | 5/15/2006 14:08 | Loan | Doc Del | | Awaiting Document Delivery Processing |
| 7 | Request Finished | Four musical minimalists | 5/15/2006 14:08 | Loan | Doc Del | | In DD Stacks Searching |
| 7 | Request Finished | Four musical minimalists | 5/15/2006 14:08 | Loan | Doc Del | | Item Found |
| 7 | Request Finished | Four musical minimalists | 5/15/2006 14:08 | Loan | Doc Del | | Awaiting Doc Del Customer Contact |
| 7 | Request Finished | Four musical minimalists | 5/15/2006 14:08 | Loan | Doc Del | | Customer Notified via Phone |
| 7 | Request Finished | Four musical minimalists | 5/15/2006 14:08 | Loan | Doc Del | | Request Finished |
| 7 | Request Finished | Four musical minimalists | 5/15/2006 14:08 | Loan | Doc Del | | Awaiting Doc Del Customer Contact |
| 7 | Request Finished | Four musical minimalists | 5/15/2006 14:08 | Loan | Doc Del | | Doc Del Customer Notified via E-Mail |
| 7 | Request Finished | Four musical minimalists | 5/15/2006 14:08 | Loan | Doc Del | | Request Finished |

Fig. 14b. Another sample of InterLibrary Loan Data

| Year | ESPNumber | LoanTitle | Predicted Spring Requests | Spring Confidence | Spring Genre Weight | Predicted Summer Requests | Summer Confidence | Summer Genre Weight | Predicted Fall Requests | Fall Confidence | Fall Genre Weight | Predicted Year Requests | Percent Requests Week1 | Percent Requests Week2 | Percent Requests Week3 | Percent Requests Week4 | Percent Requests Week5 | Percent Requests Week6 | Percent Requests Week7 | Percent Requests Week8 |
|---|---|---|---|---|---|---|---|---|---|---|---|---|---|---|---|---|---|---|---|---|
| 2007 | | Hackers wizards of the electronic age. | {0 - 0} | 0.5 | 1 | {0 - 0} | 0.5 | 1 | {0 - 1} | 0.5 | 1 | 0 | 0 | 0 | 0 | 0 | 0 | 0 | 0 | 0 |
| 2008 | | Hackers wizards of the electronic age. | {0 - 0} | 0.75 | 1 | {0 - 0} | 0.75 | 1 | {0 - 2} | 0.75 | 1 | 1 | 0 | 0 | 0 | 0 | 0 | 0 | 0 | 0 |
| 2009 | | Hackers wizards of the electronic age. | {0 - 0} | 0.95 | 1 | {0 - 0} | 0.95 | 1 | {0 - 0} | 0.5 | 1 | 0 | 0 | 0 | 0 | 0 | 0 | 0 | 0 | 0 |
| 2010 | | Hackers wizards of the electronic age. | {0 - 0} | 0.95 | 1 | {1 - 1} | 0.95 | 1 | {21 - 85} | 0.25 | 1 | 54 | 0 | 0 | 0 | 0 | 0 | 0 | 0 | 0 |
| 2011 | | Hackers wizards of the electronic age. | {112 - 124} | 0.7 | 1 | {4 - 5} | 0.7 | 1 | {12 - 206} | 0.5 | 1 | 231 | 0 | 0 | 0 | 0 | 0 | 0 | 0 | 0 |
| 2012 | | Hackers wizards of the electronic age. | {94 - 193} | 0.95 | 1 | {4 - 8} | 0.95 | 1 | {0 - 0} | 0.25 | 1 | 150 | 0 | 0 | 0 | 0 | 0 | 0 | 0 | 0 |
| 2013 | | Hackers wizards of the electronic age. | {0 - 0} | 0.7 | 1 | {0 - 0} | 0.7 | 1 | {59 - 956} | 0.1 | 1 | 510 | 0 | 0 | 0 | 0 | 0 | 0 | 0 | 0 |
| 2014 | | Hackers wizards of the electronic age. | {326 - 664} | 0.45 | 1 | {81 - 167} | 0.45 | 1 | {40 - 4080} | 0.35 | 1 | 2679 | 0 | 0 | 0 | 0 | 0 | 0 | 0 | 0 |
| 2015 | | Hackers wizards of the electronic age. | {398 - 1970} | 0.7 | 1 | {171 - 842} | 0.03 | 1 | {190 - 1550} | 0.6 | 1 | 2555 | 0 | 0 | 0 | 0 | 0 | 0 | 0 | 0 |
| 2016 | | Hackers wizards of the electronic age. | {262 - 536} | 0.45 | 1 | {214 - 538} | 0.88 | 1 | {303 - 842} | 0.85 | 1 | 1345 | 0 | 0 | 0 | 0 | 0 | 0 | 0 | 0 |
| 2010 | 311778265 | Drive : the surprising truth about what motivates us / | {0 - 0} | 0.5 | 1 | {0 - 2} | 0.5 | 1 | {0 - 0} | 0.5 | 1 | 1 | 0 | 0 | 0 | 0 | 0 | 0 | 0 | 0 |
| 2011 | 311778265 | Drive : the surprising truth about what motivates us / | {0 - 1} | 0.75 | 1 | {0 - 0} | 0.25 | 1 | {0 - 1} | 0.75 | 1 | 0 | 0 | 0 | 0 | 0 | 0 | 0 | 0 | 0 |
| 2012 | 311778265 | Drive : the surprising truth about what motivates us / | {0 - 1} | 0.95 | 1 | {0 - 0} | 0.5 | 1 | {0 - 1} | 0.95 | 1 | 0 | 0 | 0 | 0 | 0 | 0 | 0 | 0 | 0 |
| 2013 | 311778265 | Drive : the surprising truth about what motivates us / | {0 - 1} | 0.95 | 1 | {0 - 2} | 0.75 | 1 | {3 - 3} | 0.7 | 1 | 4 | 0 | 0 | 0 | 0 | 0 | 0 | 0 | 0 |
| 2014 | 311778265 | Drive : the surprising truth about what motivates us / | {5 - 5} | 0.7 | 1 | {1 - 2} | 0.95 | 1 | {8 - 17} | 0.45 | 1 | 18 | 0 | 0 | 0 | 0 | 0 | 0 | 0 | 0 |
| 2015 | 311778265 | Drive : the surprising truth about what motivates us / | {4 - 9} | 0.95 | 1 | {1 - 1} | 0.7 | 1 | {3 - 15} | 0.7 | 1 | 16 | 0 | 0 | 0 | 0 | 0 | 0 | 0 | 0 |
| 2016 | 311778265 | Drive : the surprising truth about what motivates us / | {2 - 3} | 0.7 | 1 | {0 - 0} | 0.45 | 1 | {0 - 0} | 0.45 | 1 | 2 | 0 | 0 | 0 | 0 | 0 | 0 | 0 | 0 |
| 2007 | 52948959 | The design of CMOS radio-frequency integrated circuits / | {0 - 0} | 0.5 | 1 | {0 - 0} | 0.5 | 1 | {1 - 6} | 0.5 | 1 | 3 | 0 | 0 | 0 | 0 | 0 | 0 | 0 | 0 |
| 2008 | 52948959 | The design of CMOS radio-frequency integrated circuits / | {0 - 0} | 0.75 | 1 | {0 - 0} | 0.75 | 1 | {0 - 3} | 0.25 | 1 | 1 | 0 | 0 | 0 | 0 | 0 | 0 | 0 | 0 |
| 2009 | 52948959 | The design of CMOS radio-frequency integrated circuits / | {0 - 0} | 0.95 | 1 | {0 - 0} | 0.95 | 1 | {0 - 0} | 0.1 | 1 | 0 | 0 | 0 | 0 | 0 | 0 | 0 | 0 | 0 |
| 2010 | 52948959 | The design of CMOS radio-frequency integrated circuits / | {0 - 0} | 0.95 | 1 | {0 - 0} | 0.95 | 1 | {0 - 0} | 0.286 | 1 | 0 | 0 | 0 | 0 | 0 | 0 | 0 | 0 | 0 |
| 2011 | 52948959 | The design of CMOS radio-frequency integrated circuits / | {2 - 2} | 0.95 | 1 | {0 - 0} | 0.95 | 1 | {0 - 0} | 0.536 | 1 | 2 | 0 | 0 | 0 | 0 | 0 | 0 | 0 | 0 |
| 2012 | 52948959 | The design of CMOS radio-frequency integrated circuits / | {3 - 4} | 0.7 | 1 | {0 - 0} | 0.95 | 1 | {0 - 0} | 0.786 | 1 | 3 | 0 | 0 | 0 | 0 | 0 | 0 | 0 | 0 |
| 2013 | 52948959 | The design of CMOS radio-frequency integrated circuits / | {5 - 10} | 0.95 | 1 | {0 - 0} | 0.95 | 1 | {0 - 0} | 0.95 | 1 | 7 | 0 | 0 | 0 | 0 | 0 | 0 | 0 | 0 |
| 2014 | 52948959 | The design of CMOS radio-frequency integrated circuits / | {3 - 4} | 0.7 | 1 | {0 - 0} | 0.95 | 1 | {0 - 0} | 0.95 | 1 | 3 | 0 | 0 | 0 | 0 | 0 | 0 | 0 | 0 |
| 2015 | 52948959 | The design of CMOS radio-frequency integrated circuits / | {1 - 3} | 0.45 | 1 | {0 - 0} | 0.95 | 1 | {0 - 1} | 0.95 | 1 | 2 | 0 | 0 | 0 | 0 | 0 | 0 | 0 | 0 |
| 2016 | 52948959 | The design of CMOS radio-frequency integrated circuits / | {0 - 2} | 0.7 | 1 | {0 - 0} | 0.95 | 1 | {0 - 1} | 0.95 | 1 | 1 | 0 | 0 | 0 | 0 | 0 | 0 | 0 | 0 |
| 2009 | 48588434 | The five dysfunctions of a team : a leadership fable / | {0 - 0} | 0.5 | 1 | {0 - 0} | 0.5 | 1 | {0 - 2} | 0.5 | 1 | 1 | 0 | 0 | 0 | 0 | 0 | 0 | 0 | 0 |
| 2010 | 48588434 | The five dysfunctions of a team : a leadership fable / | {0 - 0} | 0.75 | 1 | {0 - 0} | 0.75 | 1 | {0 - 2} | 0.75 | 1 | 1 | 0 | 0 | 0 | 0 | 0 | 0 | 0 | 0 |
| 2011 | 48588434 | The five dysfunctions of a team : a leadership fable / | {0 - 0} | 0.95 | 1 | {0 - 0} | 0.95 | 1 | {0 - 0} | 0.5 | 1 | 0 | 0 | 0 | 0 | 0 | 0 | 0 | 0 | 0 |
| 2012 | 48588434 | The five dysfunctions of a team : a leadership fable / | {1 - 1} | 0.95 | 1 | {0 - 0} | 0.95 | 1 | {1 - 4} | 0.571 | 1 | 3 | 0 | 0 | 0 | 0 | 0 | 0 | 0 | 0 |
| 2013 | 48588434 | The five dysfunctions of a team : a leadership fable / | {0 - 0} | 0.7 | 1 | {0 - 0} | 0.95 | 1 | {2 - 9} | 0.821 | 1 | 5 | 0 | 0 | 0 | 0 | 0 | 0 | 0 | 0 |
| 2014 | 48588434 | The five dysfunctions of a team : a leadership fable / | {4 - 8} | 0.45 | 1 | {0 - 0} | 0.95 | 1 | {3 - 4} | 0.571 | 1 | 9 | 0 | 0 | 0 | 0 | 0 | 0 | 0 | 0 |

Fig. 15a. Sample of Prediction Data

| | | | | | | | | | | | | | | | | | | | | |
|---|---|---|---|---|---|---|---|---|---|---|---|---|---|---|---|---|---|---|---|---|
| 2015 | 48588434 | The five dysfunctions of a team : a leadership fable / | {2 - 12} | 0.7 | 1 | {0 - 0} | 0.95 | 1 | {0 - 1} | 0.321 | 1 | 7 | 0 | 0 | 0 | 0 | 0 | 0 | 0 | 0 |
| 2016 | 48588434 | The five dysfunctions of a team : a leadership fable / | {0 - 1} | 0.45 | 1 | {0 - 0} | 0.95 | 1 | {0 - 1} | 0.571 | 1 | 0 | 0 | 0 | 0 | 0 | 0 | 0 | 0 | 0 |
| 2011 | 48187807 | Applied numerical methods for engineers and scientists / | {1 - 6} | 0.5 | 1 | {0 - 0} | 0.5 | 1 | {0 - 2} | 0.5 | 1 | 4 | 0 | 0 | 0 | 0 | 0 | 0 | 0 | 0 |
| 2012 | 48187807 | Applied numerical methods for engineers and scientists / | {1 - 6} | 0.75 | 1 | {0 - 0} | 0.75 | 1 | {2 - 11} | 0.357 | 1 | 9 | 0 | 0 | 0 | 0 | 0 | 0 | 0 | 0 |
| 2013 | 48187807 | Applied numerical methods for engineers and scientists / | {1 - 3} | 0.5 | 1 | {0 - 0} | 0.95 | 1 | {2 - 22} | 0.607 | 1 | 14 | 0 | 0 | 0 | 0 | 0 | 0 | 0 | 0 |
| 2014 | 48187807 | Applied numerical methods for engineers and scientists / | {1 - 5} | 0.75 | 1 | {0 - 0} | 0.95 | 1 | {5 - 14} | 0.857 | 1 | 12 | 0 | 0 | 0 | 0 | 0 | 0 | 0 | 0 |
| 2015 | 48187807 | Applied numerical methods for engineers and scientists / | {0 - 1} | 0.5 | 1 | {0 - 0} | 0.95 | 1 | {4 - 5} | 0.607 | 1 | 4 | 0 | 0 | 0 | 0 | 0 | 0 | 0 | 0 |
| 2016 | 48187807 | Applied numerical methods for engineers and scientists / | {0 - 0} | 0.25 | 1 | {0 - 0} | 0.95 | 1 | {0 - 0} | 0.357 | 1 | 0 | 0 | 0 | 0 | 0 | 0 | 0 | 0 | 0 |
| 2010 | 44391722 | Design of analog CMOS integrated circuits / | {2 - 8} | 0.5 | 1 | {0 - 0} | 0.5 | 1 | {2 - 8} | 0.5 | 1 | 10 | 0 | 0 | 0 | 0 | 0 | 0 | 0 | 0 |
| 2011 | 44391722 | Design of analog CMOS integrated circuits / | {1 - 4} | 0.25 | 1 | {0 - 0} | 0.75 | 1 | {3 - 14} | 0.75 | 1 | 10 | 0 | 0 | 0 | 0 | 0 | 0 | 0 | 0 |
| 2012 | 44391722 | Design of analog CMOS integrated circuits / | {0 - 8} | 0.5 | 1 | {0 - 0} | 0.95 | 1 | {7 - 13} | 0.95 | 1 | 14 | 0 | 0 | 0 | 0 | 0 | 0 | 0 | 0 |
| 2013 | 44391722 | Design of analog CMOS integrated circuits / | {2 - 8} | 0.75 | 1 | {0 - 0} | 0.95 | 1 | {9 - 11} | 0.95 | 1 | 15 | 0 | 0 | 0 | 0 | 0 | 0 | 0 | 0 |
| 2014 | 44391722 | Design of analog CMOS integrated circuits / | {0 - 1} | 0.5 | 1 | {0 - 0} | 0.95 | 1 | {7 - 8} | 0.7 | 1 | 7 | 0 | 0 | 0 | 0 | 0 | 0 | 0 | 0 |
| 2015 | 44391722 | Design of analog CMOS integrated circuits / | {0 - 2} | 0.75 | 1 | {0 - 0} | 0.95 | 1 | {4 - 9} | 0.95 | 1 | 7 | 0 | 0 | 0 | 0 | 0 | 0 | 0 | 0 |
| 2016 | 44391722 | Design of analog CMOS integrated circuits / | {1 - 2} | 0.95 | 1 | {0 - 0} | 0.95 | 1 | {3 - 3} | 0.7 | 1 | 4 | 0 | 0 | 0 | 0 | 0 | 0 | 0 | 0 |
| 2007 | 44162620 | An introduction to mixed-signal IC test and measurement / | {1 - 4} | 0.5 | 1 | {0 - 0} | 0.5 | 1 | {0 - 0} | 0.5 | 1 | 2 | 0 | 0 | 0 | 0 | 0 | 0 | 0 | 0 |
| 2008 | 44162620 | An introduction to mixed-signal IC test and measurement / | {0 - 2} | 0.25 | 1 | {0 - 0} | 0.75 | 1 | {0 - 0} | 0.75 | 1 | 1 | 0 | 0 | 0 | 0 | 0 | 0 | 0 | 0 |
| 2009 | 44162620 | An introduction to mixed-signal IC test and measurement / | {0 - 0} | 0.1 | 1 | {0 - 0} | 0.95 | 1 | {0 - 0} | 0.95 | 1 | 0 | 0 | 0 | 0 | 0 | 0 | 0 | 0 | 0 |
| 2010 | 44162620 | An introduction to mixed-signal IC test and measurement / | {0 - 20} | 0.1 | 1 | {0 - 0} | 0.95 | 1 | {1 - 1} | 0.95 | 1 | 11 | 0 | 0 | 0 | 0 | 0 | 0 | 0 | 0 |
| 2011 | 44162620 | An introduction to mixed-signal IC test and measurement / | {0 - 50} | 0.35 | 1 | {0 - 0} | 0.95 | 1 | {4 - 4} | 0.7 | 1 | 29 | 0 | 0 | 0 | 0 | 0 | 0 | 0 | 0 |
| 2012 | 44162620 | An introduction to mixed-signal IC test and measurement / | {2 - 20} | 0.6 | 1 | {0 - 0} | 0.95 | 1 | {2 - 5} | 0.95 | 1 | 14 | 0 | 0 | 0 | 0 | 0 | 0 | 0 | 0 |
| 2013 | 44162620 | An introduction to mixed-signal IC test and measurement / | {2 - 6} | 0.35 | 1 | {0 - 0} | 0.95 | 1 | {3 - 3} | 0.7 | 1 | 7 | 0 | 0 | 0 | 0 | 0 | 0 | 0 | 0 |
| 2014 | 44162620 | An introduction to mixed-signal IC test and measurement / | {0 - 0} | 0.1 | 1 | {0 - 0} | 0.95 | 1 | {4 - 10} | 0.893 | 1 | 7 | 0 | 0 | 0 | 0 | 0 | 0 | 0 | 0 |
| 2015 | 44162620 | An introduction to mixed-signal IC test and measurement / | {0 - 60} | 0.1 | 1 | {0 - 0} | 0.95 | 1 | {4 - 5} | 0.643 | 1 | 34 | 0 | 0 | 0 | 0 | 0 | 0 | 0 | 0 |
| 2016 | 44162620 | An introduction to mixed-signal IC test and measurement / | {0 - 65} | 0.35 | 1 | {0 - 1} | 0.95 | 1 | {0 - 0} | 0.393 | 1 | 32 | 0 | 0 | 0 | 0 | 0 | 0 | 0 | 0 |
| 2011 | 39849337 | Real analysis : modern techniques and their applications / | {0 - 0} | 0.5 | 1 | {0 - 0} | 0.5 | 1 | {0 - 1} | 0.5 | 1 | 0 | 0 | 0 | 0 | 0 | 0 | 0 | 0 | 0 |
| 2012 | 39849337 | Real analysis : modern techniques and their applications / | {0 - 2} | 0.75 | 1 | {0 - 2} | 0.75 | 1 | {0 - 1} | 0.75 | 1 | 2 | 0 | 0 | 0 | 0 | 0 | 0 | 0 | 0 |
| 2013 | 39849337 | Real analysis : modern techniques and their applications / | {2 - 4} | 0.551 | 1 | {1 - 3} | 0.95 | 1 | {3 - 6} | 0.5 | 1 | 9 | 0 | 0 | 0 | 0 | 0 | 0 | 0 | 0 |
| 2014 | 39849337 | Real analysis : modern techniques and their applications / | {1 - 4} | 0.801 | 1 | {1 - 1} | 0.7 | 1 | {2 - 10} | 0.75 | 1 | 9 | 0 | 0 | 0 | 0 | 0 | 0 | 0 | 0 |
| 2015 | 39849337 | Real analysis : modern techniques and their applications / | {1 - 1} | 0.551 | 1 | {0 - 0} | 0.45 | 1 | {2 - 4} | 0.5 | 1 | 4 | 0 | 0 | 0 | 0 | 0 | 0 | 0 | 0 |
| 2016 | 39849337 | Real analysis : modern techniques and their applications / | {1 - 4} | 0.801 | 1 | {0 - 1} | 0.7 | 1 | {1 - 7} | 0.75 | 1 | 6 | 0 | 0 | 0 | 0 | 0 | 0 | 0 | 0 |
| 2010 | 39261809 | Practical nonparametric statistics / | {0 - 0} | 0.5 | 1 | {0 - 0} | 0.5 | 1 | {0 - 2} | 0.5 | 1 | 1 | 0 | 0 | 0 | 0 | 0 | 0 | 0 | 0 |
| 2011 | 39261809 | Practical nonparametric statistics / | {0 - 0} | 0.75 | 1 | {0 - 0} | 0.75 | 1 | {0 - 1} | 0.75 | 1 | 0 | 0 | 0 | 0 | 0 | 0 | 0 | 0 | 0 |
| 2012 | 39261809 | Practical nonparametric statistics / | {0 - 0} | 0.95 | 1 | {0 - 0} | 0.95 | 1 | {1 - 2} | 0.56 | 1 | 1 | 0 | 0 | 0 | 0 | 0 | 0 | 0 | 0 |

Fig. 15b. Sample of Prediction Data, continued

| | | | | | | | | | | | | | | | | | | | | |
|---|---|---|---|---|---|---|---|---|---|---|---|---|---|---|---|---|---|---|---|---|
| 2013 | 39261809 | Practical nonparametric statistics / | {0 - 0} | 0.95 | 1 | {0 - 0} | 0.95 | 1 | {1 - 5} | 0.81 | 1 | 3 | 0 | 0 | 0 | 0 | 0 | 0 | 0 | 0 |
| 2014 | 39261809 | Practical nonparametric statistics / | {0 - 0} | 0.95 | 1 | {0 - 0} | 0.95 | 1 | {1 - 2} | 0.56 | 1 | 1 | 0 | 0 | 0 | 0 | 0 | 0 | 0 | 0 |
| 2015 | 39261809 | Practical nonparametric statistics / | {5 - 6} | 0.7 | 1 | {1 - 1} | 0.95 | 1 | {0 - 0} | 0.31 | 1 | 6 | 0 | 0 | 0 | 0 | 0 | 0 | 0 | 0 |
| 2016 | 39261809 | Practical nonparametric statistics / | {8 - 16} | 0.95 | 1 | {2 - 2} | 0.7 | 1 | {0 - 0} | 0.56 | 1 | 14 | 0 | 0 | 0 | 0 | 0 | 0 | 0 | 0 |
| 2007 | 37499871 | Analysis of transport phenomena / | {0 - 0} | 0.5 | 1 | {0 - 0} | 0.5 | 1 | {0 - 0} | 0.5 | 1 | 0 | 0 | 0 | 0 | 0 | 0 | 0 | 0 | 0 |
| 2008 | 37499871 | Analysis of transport phenomena / | {0 - 0} | 0.75 | 1 | {0 - 0} | 0.75 | 1 | {0 - 0} | 0.75 | 1 | 0 | 0 | 0 | 0 | 0 | 0 | 0 | 0 | 0 |
| 2009 | 37499871 | Analysis of transport phenomena / | {0 - 0} | 0.95 | 1 | {0 - 0} | 0.95 | 1 | {0 - 0} | 0.95 | 1 | 0 | 0 | 0 | 0 | 0 | 0 | 0 | 0 | 0 |
| 2010 | 37499871 | Analysis of transport phenomena / | {0 - 0} | 0.95 | 1 | {0 - 0} | 0.95 | 1 | {0 - 0} | 0.95 | 1 | 0 | 0 | 0 | 0 | 0 | 0 | 0 | 0 | 0 |
| 2011 | 37499871 | Analysis of transport phenomena / | {3 - 3} | 0.905 | 1 | {0 - 0} | 0.95 | 1 | {1 - 1} | 0.95 | 1 | 4 | 0 | 0 | 0 | 0 | 0 | 0 | 0 | 0 |
| 2012 | 37499871 | Analysis of transport phenomena / | {4 - 5} | 0.854 | 1 | {0 - 0} | 0.95 | 1 | {1 - 1} | 0.95 | 1 | 5 | 0 | 0 | 0 | 0 | 0 | 0 | 0 | 0 |
| 2013 | 37499871 | Analysis of transport phenomena / | {3 - 4} | 0.604 | 1 | {0 - 0} | 0.95 | 1 | {0 - 0} | 0.7 | 1 | 3 | 0 | 0 | 0 | 0 | 0 | 0 | 0 | 0 |
| 2014 | 37499871 | Analysis of transport phenomena / | {1 - 4} | 0.854 | 1 | {0 - 0} | 0.95 | 1 | {0 - 0} | 0.95 | 1 | 2 | 0 | 0 | 0 | 0 | 0 | 0 | 0 | 0 |
| 2015 | 37499871 | Analysis of transport phenomena / | {2 - 4} | 0.95 | 1 | {0 - 1} | 0.95 | 1 | {4 - 4} | 0.7 | 1 | 7 | 0 | 0 | 0 | 0 | 0 | 0 | 0 | 0 |
| 2016 | 37499871 | Analysis of transport phenomena / | {0 - 0} | 0.7 | 1 | {0 - 1} | 0.95 | 1 | {2 - 5} | 0.95 | 1 | 3 | 0 | 0 | 0 | 0 | 0 | 0 | 0 | 0 |
| 2009 | 35397903 | Logic for applications / | {0 - 0} | 0.5 | 1 | {0 - 0} | 0.5 | 1 | {3 - 12} | 0.5 | 1 | 7 | 0 | 0 | 0 | 0 | 0 | 0 | 0 | 0 |
| 2010 | 35397903 | Logic for applications / | {1 - 5} | 0.476 | 1 | {0 - 0} | 0.75 | 1 | {4 - 18} | 0.75 | 1 | 14 | 0 | 0 | 0 | 0 | 0 | 0 | 0 | 0 |
| 2011 | 35397903 | Logic for applications / | {3 - 17} | 0.726 | 1 | {0 - 0} | 0.95 | 1 | {7 - 14} | 0.95 | 1 | 20 | 0 | 0 | 0 | 0 | 0 | 0 | 0 | 0 |
| 2012 | 35397903 | Logic for applications / | {5 - 9} | 0.476 | 1 | {0 - 0} | 0.95 | 1 | {9 - 10} | 0.7 | 1 | 16 | 0 | 0 | 0 | 0 | 0 | 0 | 0 | 0 |
| 2013 | 35397903 | Logic for applications / | {0 - 2} | 0.226 | 1 | {0 - 0} | 0.95 | 1 | {8 - 16} | 0.95 | 1 | 13 | 0 | 0 | 0 | 0 | 0 | 0 | 0 | 0 |
| 2014 | 35397903 | Logic for applications / | {0 - 4} | 0.476 | 1 | {0 - 0} | 0.95 | 1 | {5 - 5} | 0.7 | 1 | 7 | 0 | 0 | 0 | 0 | 0 | 0 | 0 | 0 |
| 2015 | 35397903 | Logic for applications / | {0 - 1} | 0.226 | 1 | {0 - 1} | 0.95 | 1 | {3 - 6} | 0.95 | 1 | 4 | 0 | 0 | 0 | 0 | 0 | 0 | 0 | 0 |
| 2016 | 35397903 | Logic for applications / | {0 - 0} | 0.1 | 1 | {0 - 0} | 0.7 | 1 | {6 - 6} | 0.736 | 1 | 6 | 0 | 0 | 0 | 0 | 0 | 0 | 0 | 0 |

Fig. 15c. Sample of Prediction Data, continued

SYSTEMS AND METHODS FOR PREDICTIVELY MANAGING COLLECTIONS OF ITEMS

TECHNICAL FIELD

Embodiments relate to tracking and managing items maintained in an inventory or collection, to database hardware and software, to supervised machine learning, and to unsupervised machine learning.

BACKGROUND

In the past, various forms of inventory trackers have been used for managing the items in collections. For example, a library is a collection contain books, periodicals, treatises, dissertations, theses, and similar items. The Integrated Library System (ILS) is a set of databases, systems, tools, and interfaces through which librarians and library staff can track library collections. A collections database can track what items the library owns, where items are located, if items are currently loaned out and to whom, when items were loaned out, and when items were returned. Cooperating libraries can lend items to each other. An interlibrary loan database can include a database of records indicating items available for loan, loaned items, and requests for items to be loaned. The loan database can include historical data for loans and loan requests.

Collections other than libraries can use similar software to record what items are in the collection, where the items are located/stored, who has the item, when shared items are requested, etc.

Machine learning has been advancing rapidly and machine learning techniques can be advantageously used to analyze collections of items, such as library collections, in order to better manage the collection and to manage the collection such that it better serves the needs of its users (e.g. library patrons, researchers, and students). Phillipps et al. obtained U.S. Pat. No. 9,646,262, titled "DATA INTELLIGENCE USING MACHINE LEARNING" that issued May 17, 2017 and that discloses machine learning techniques including supervised learning, unsupervised learning, clustering algorithms, neural networks, predictive modeling, k-nearest neighbors, regression models, and others. It is for it machine learning disclosures and other teachings that U.S. Pat. No. 9,646,262 is herein incorporated by reference in its entirety.

Current methods of tracking the items in a collection are not well suited for analyzing the collection with respect to how well the collection meets the needs of those accessing the collection. Systems and methods for more effective analysis of collections of items are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a collection of items, such as a library, can more efficiently be managed by assembling data from disparate databases to produce an incomplete data set from which a prepared data set can be produced. For example, a first data set can store statuses of the items in a collection and can store historical item status changes. The item status changes can be time stamped. For example, the status of a book in a library can be "shelved" and can even indicate the number of such books currently shelved, checked out, their location, and other information. Similarly, the item status changes can include information indicating the date, perhaps even the time, when a book was obtained (borrowed/purchased, etc.), when and the book was returned (where, etc.), when the book was checked out (where, by who, due date for return, etc.), and when the book was loaned to a cooperating library (to whom, due date for return, etc.). The item statuses and item status changes can be stored in association with item identifiers that identify the items in the collection.

It is another aspect of the embodiments that a second data set can store supplementations and supplementation requests. Supplementations are temporary transfers of shared items into a collection. For example, interlibrary loans temporarily transfer books and other items in library collections between cooperating libraries. A supplementation request is a request for a supplementation. For example, one library can request interlibrary loan of a book from another library or group of cooperating libraries. In the example, a supplementation (interlibrary loan) temporarily transfers (loans) a shared item (book) to a collection (library). A supplementation request (interlibrary loan request) is a request for a supplementation (interlibrary loan).

It is yet another aspect of the embodiments that an incomplete data set can be produced that associates the item identifiers to the item statuses, item status changes, supplementations, and supplementation requests. While useful, this incomplete data set can be improved on such that supervised and unsupervised learning algorithms can produce useful information.

It is a further aspect of the embodiments that a third database is accessed to supply detailed information about item properties. For example, the item properties of a book include genre, subject, title, author, etc. For every item in the collection, at least one of the item properties can be obtained.

An analyst can select the item properties that are to be used in an analysis. For example, the analyst can choose to analyze a library by subject, by genre, or both. In general, the analyst selects a few of the available properties. The selected properties are usually a proper subset of the set of all item properties. The analyst can also select the items to be included in the analysis such as selecting only those items currently available, only those unavailable, only those currently available and owned, etc. For example, a library's currently available items can be books currently shelved such that a library patron can check out or read the book. The shelved books can include those owned by the library (or library system) and those lent to the library. As such "currently available and owned" would be shelved books owned by the library. A library system is typically a group of commonly owned libraries having a commonly owned collection.

A prepared data set can be produced from the incomplete data set by associating item properties, such as those selected by the analyst, with every item in the collection, ever loaned to the collection, or requested for the collection. For example, the subject or genre of every book in a library as well as every book that has been requested or borrowed (via interlibrary loan) can be recorded in the prepared data set. An item property has an item property value. For example, "subject" is an item property for books whereas "biology" can be the subject of a book. Here, the item identifier for the biology book can be associated with "biology". The prepared data set can associate the item identifiers to the item statuses, the item status changes, the supplementations, the supplementation requests, and the selected item properties.

The analyst can choose an integer, k, the desired number of clusters. The integer K and the prepared data set can be input to a clustering algorithm, thereby resulting in k clusters. For example, the prepared data set for a library can associate the item status changes of items (books) with the "subject" item property the item property values (subjects) can include biology, geology, machine learning, and artificial intelligence. Another example, the item property value is "genre" that can have item property values including fiction, non-fiction, DVD, video, drama, historical fiction, and western stories. Many library data sets list DVD and video as parts of some item's genres indicating that the physical medium of the item is a DVD or video while it is less common for book, hardcover, or paperback to be listed as genres. Note that an item property for a particular item can have more than one property value. For example and item's genre can include both DVD and fiction. The clustering algorithm can produce k clusters of item status changes for the various subjects in the prepared data set. Another library example is k clusters of item identifiers for the various subjects in the prepared data set. For the second example, the prepared data set would have the item identifiers for associated with the "subject" item property of the books in the library. The two examples can be combined to produce k clusters of status changes and k clusters of item identifiers. The scatter plots can be compared or combined into a single scatter plot to reveal differences between user activity (indicated by status change clusters) and collection content (indicated by item identifier clusters).

A still yet further embodiment can automatically produce purchase requests, such as purchase orders, that a librarian can approve in light of the data clusters and the libraries goals or budget. A purchase requests can be for an item that, if added to the library, causes one of the k-clusters of item identifiers to move toward one of the k-clusters of status changes.

The item properties, such as genre or subject, are sometimes referred to as organizing variables. As such, the clusters would be based on the organizing variable and the organizing variable is a variable that is common to the items in the data sets being analyzed. For a particular item, the organizing variable can be thought of as an independent variable that takes on a value: "subject" can have the value "Set Theory."

It is yet another aspect of the embodiments that a learning algorithm can predict future user activity based on past user activity. The learning algorithms known to those practiced in the art of machine learning often produce predictions or estimates from a set of data. More data can then be provided to find the differences, often called error in the prediction. By attempting to minimize the error, the algorithm learns. Iteratively applying this principal allows the learning algorithm to produce smaller and smaller errors.

User activity related to a collection of items during a future time period can be predicted by breaking the past into N time periods and iteratively submitting each time period's status changes and supplementation requests to a learning algorithm.

The learning algorithm is first initialized and caused to produce a prediction for the second time period based on data from the first time period. Next, the learning algorithm can produce a prediction for the third time period based on data from the second time period and the prediction for the second period. This process can be repeated until a prediction for the (N+1)th time period is produced based on the data for the Nth time period and the prediction for the Nth time period. The data for a time period can include one or more of item status changes, supplementation requests, etc. The data can be limited to specific item status changes such as when an item goes from "shelved" or "warehoused" to "on loan", "checked out" (as when a person checks a book out from a library), "requested" (such as user activity resulting in an interlibrary loan request), etc.

A shortage prediction can be produced by comparing the items in the collection to predicted user activity. For example, a shortage of one biology book is predicted when a library has 6 of the books shelved and the predicted number of check-outs is 7. The shortage prediction and/or the period N+1 prediction can be supplied to an analyst or librarian such that the shortage can be averted by buying, borrowing, or recalling items. Recalling an item means getting a loaned out item to be returned. Purchase requests and loan requests can be automatically prepared such that a librarian informed of the predicted shortage and/or period N+1 can approve the request and thereby avoid at least part of the predicted shortage. Note that the shortage prediction can indicate predicted shortages of numerous items in the collection. For example, a library's shortage prediction can indicate the predicted shortages of numerous books, periodicals, treatises, dissertations, and theses.

It is still yet another aspect of the disclosed embodiments to provide for improvements in computing operations such as computer processing, and memory and power management.

It is an even further aspect of the disclosed embodiments to provide for a non-abstract improvement to a computer technology via a technical solution to the technical problem (s) identified in the background section of this disclosure.

These and other features and advantages of the disclosed embodiments will be presented in more detail in the following specification and the accompanying figures, which illustrate by way of example the principles of the disclosed embodiments.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 10 illustrates an example of a third database having records in accordance with aspects of the embodiments;

FIG. 11 provides a table of book genres and subjects in accordance with aspects of the embodiments;

FIG. 12 provides a table of collection data in accordance with aspects of the embodiments;

FIG. 13 provides a list of genres in accordance with aspects of the embodiments;

FIGS. 14a-14b provide a table of interlibrary loan data in accordance with aspects of the embodiments; and FIGS. 15a-15c provide a table of prediction data in accordance with aspects of the embodiments.

DETAILED DESCRIPTION

Figure 1:
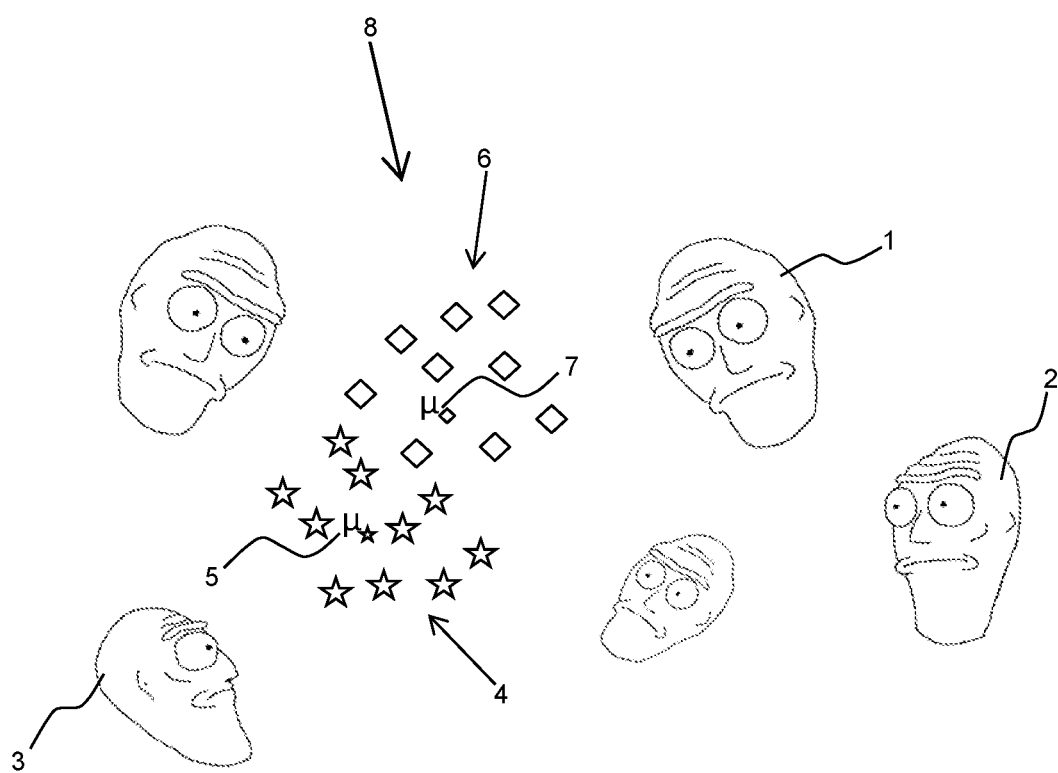
FIG. 1 illustrates analysts viewing a scatter plot showing clusters of item status changes and a cluster of item identifiers in accordance with aspects of the embodiments.

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, system, or instantiation of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

All of the systems and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

FIG. 1 illustrates analysts 1, 2, 3 viewing a scatter plot 8 showing clusters 4, 6 of item status changes and a cluster of item identifiers in accordance with aspects of the embodiments. The item status changes are shown as stars. The cluster of item status changes 4 has a mean, the item status mean 5. The cluster of item identifiers 6 has a mean, the item identifier mean 7. The scatter plot 8 shows what the collection got and, based on the time status changes, what the collection may need. The analysts 1-3, having viewed the product of the embodiments can endeavour to transition "got" to "need."

Figure 2:
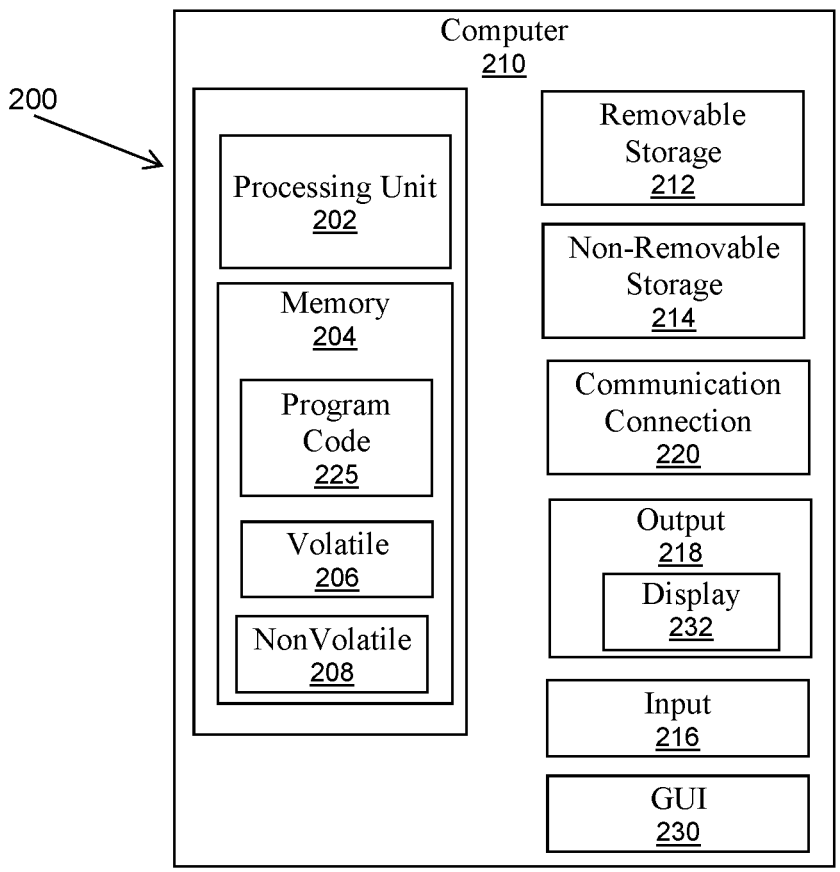
FIG. 2 depicts a block diagram of a computer system which is implemented in accordance with the disclosed embodiments.
Figure 3:
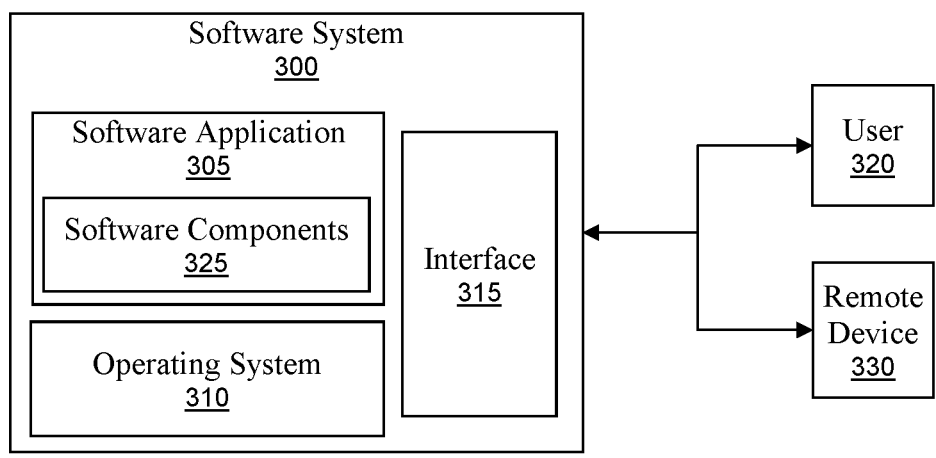
FIG. 3 depicts a computer software system for directing the operation of the data-processing system depicted in FIG. 2 in accordance with an example embodiment.
Figure 4:
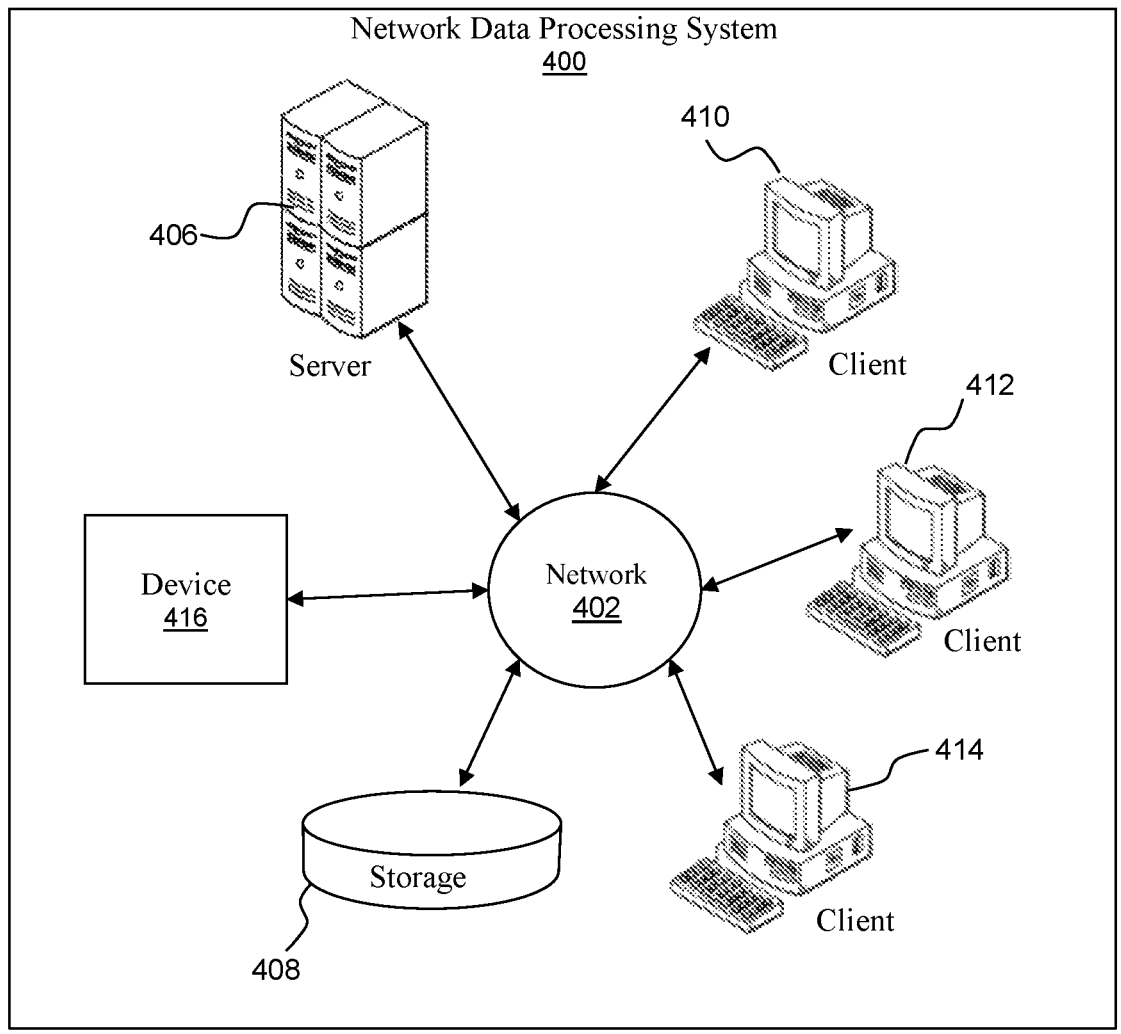
FIG. 4 depicts a graphical representation of a network of data-processing devices in which aspects of the present embodiments may be implemented.

FIGS. 2-4 are provided as exemplary diagrams of data-processing environments in which embodiments of the present invention may be implemented. It should be appreciated that FIGS. 2-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 200 that executes programming for implementing parts of the methods and systems disclosed herein is shown in FIG. 1. A computing device in the form of a computer 210 configured to interface with controllers, peripheral devices, and other elements disclosed herein may include one or more processing units 202, memory 204, removable storage 212, and non-removable storage 214. Memory 204 may include volatile memory 206 and non-volatile memory 208. Computer 210 may include or have access to a computing environment that includes a variety of transitory and non-transitory computer-readable media such as volatile memory 206 and non-volatile memory 208, removable storage 212 and non-removable storage 214. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 210 may include, or have access to, a computing environment that includes input 216, output 218, and a communication connection 220. The computer may operate in a networked environment using a communication connection 220 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 4 below.

Output 218 is most commonly provided as a computer monitor, but may include any output device. Output 218 and/or input 216 may include a data collection apparatus associated with computer system 200. In addition, input 216, which commonly includes a computer keyboard and/or pointing device such as a computer mouse, computer track pad, or the like, allows a user to select and instruct computer system 200. A user interface can be provided using output 218 and input 216. Output 218 may include a display 232 for displaying data and information for a user, or for interactively displaying a GUI (graphical user interface) 230. A GUI is typically responsive of user inputs entered through input 216 and typically displays images and data on display 232.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 216 such as, for example, a pointing device such as a mouse, and/or with a keyboard. A particular item can function in the same manner to the user in all applications because the GUI provides standard software routines (e.g., program code 225 can include such software routines) to handle these elements and report the user's actions. The GUI can further be used to display the electronic service image frames as discussed below.

Computer-readable instructions, for example, program code 225, which can include or be representative of software routines, software subroutines, software objects, nodes, etc. described herein, are stored on a computer-readable medium and are executable by the processing unit 202 of computer 210. Program code 225 may include a computer application. A hard drive, CD-ROM, RAM, Flash Memory, and a USB drive are just some examples of articles including a computer-readable medium.

FIG. 3 illustrates a software system 300, which may be employed for directing the operation of the data-processing systems such as computer system 200 depicted in FIG. 2. Software application 305, may be stored in memory 204, on removable storage 212, or on non-removable storage 214 shown in FIG. 1, and generally includes and/or is associated with a kernel or operating system 310 and a shell or interface 315. One or more application programs may be "loaded" (i.e., transferred from removable storage 212 or non-removable storage 214 into the memory 204) for execution by the data-processing system 200. The application program 305 can include software components 325 such as software modules, software subroutines, and software objects 325. The data-processing system 200 can receive user commands and data through interface 315, which can include input 216, output 218, and communications connections 220 accessible by a user 320 or remote device 330. These inputs may then be acted upon by the computer system 200 in accordance with instructions from operating system 310 and/or software application 305 and any software components 325 thereof.

Generally, software components 325 can include, but are not limited to, routines, subroutines, software applications, programs, objects, modules, objects (used in object oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module," or "node" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only to within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 315 can include a graphical user interface 230 that can display results, whereupon a user 320 or remote device 330 may supply additional inputs or terminate a particular session. In some embodiments, operating system 310 and GUI 230 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, software components 325, which can include instructions for carrying out steps or logical operations such as those shown and described herein.

FIG. 4 depicts a graphical representation of a network of data-processing systems 400 in which aspects of the present invention may be implemented. Network data-processing system 400 can be a network of computers or other such devices, such as mobile phones, smartphones, sensors, controllers, speakers, tactile devices, and the like, in which embodiments of the present invention may be implemented. Note that the system 400 can be implemented in the context of a software code such as program code 225. The system 400 includes a network 402 in communication with one or more clients 410, 412, and 414. Network 402 may also be in communication with one or more devices 416, servers 406, and storage 408. Network 402 is a medium that can be used to provide communications links between various devices and computers connected together within a networked data processing system such as computer system 200. Network 402 may include connections such as wired communication links, wireless communication links of various types, and fiber optic cables. Network 402 can communicate with one or more servers 406, one or more external devices such as device 416, and a memory storage unit such as, for example, memory or database 408. It should be understood that device 416 may be embodied as networked equipment such as a robot, printer, scanner, or other device that measures or manipulates physical objects.

In the depicted example, device 416, server 406, and clients 410, 412, and 414 connect to network 402 along with storage unit 408. Clients 410, 412, and 414 may be, for example, personal computers or network computers, handheld devices, mobile devices, tablet devices, smartphones, personal digital assistants, printing devices, recording devices, speakers, MFDs (printer/scanner/fax combinations device), etc. Computer system 200 depicted in FIG. 2 can be, for example, a client such as client 410 and/or 412 and/or 414.

Computer system 200 can also be implemented as a server such as server 406, depending upon design considerations. In the depicted example, server 406 provides data such as boot files, operating system images, applications, and application updates to clients 410, 412, and/or 414. Clients 410, 412, and 414 and device 416 are clients to server 406 in this example. Network data-processing system 400 may include additional servers, clients, and other devices not shown. Specifically, clients may connect to any member of a network of servers, which provide equivalent content. A networked computer or device 406-416 can provide a network accessible webhook or API (Application Program Interface) such that other machines can use the webhooks or APIs to remotely execute program code.

In the depicted example, network data-processing system 400 is the Internet, with network 402 representing a worldwide collection of networks and gateways that use standardized protocols, such as the Transmission Control Protocol/Internet Protocol (TCP/IP), to communicate with one another. At the heart of the internet is a backbone of high-speed data communication lines between major communications nodes, bridges, routers, and computers consisting of thousands of commercial, government, educational, and other computer systems that route data and messages. Of course, network data-processing system 400 may also be implemented as a number of different types of networks such as, for example, an intranet, a local area network (LAN), or a wide area network (WAN). FIGS. 2-4 are intended as examples and not as architectural limitations for different embodiments of the present invention.

The description herein is presented with respect to embodiments that can be embodied in the context of, or require the use of, a data-processing system such as computer system 200, in conjunction with program code 225, software system 300, or data-processing system 400 and network 402 depicted in FIGS. 1-3. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Computer systems 200 and software systems can take the form of or run as virtual machines (VMs) or containers that run on physical machines. A VM or container typically supplies an operating environment, appearing to be an operating system, to program code 225 and software applications 325 running in the VM or container. A single physical computer can run a collection of VMs and containers. In fact, the entire network data processing system 400 (but likely excluding device 416) with client 410, 412, 414, server 406, storage 408, and network 402 all virtualized and running within a single computer (or a few computers) running VMs or containers. Those practiced in cloud computing are practiced in the use of VMs, containers, virtualized networks, and related technologies.

Libraries are collections of books, periodicals, and other items that can be read in situ, checked out by patrons, and shared with other libraries. Collections are more useful when the items in the collection reflect user interests. Cluster analysis of the collection can be juxtaposed with cluster analysis of items taken from, borrowed from, or requested from the collection. The juxtaposition reveals differences between the collection and the user's desired collection. The collection can also be adapted to meet expected future needs by predicting future user needs based on past user behavior.

Figure 5:
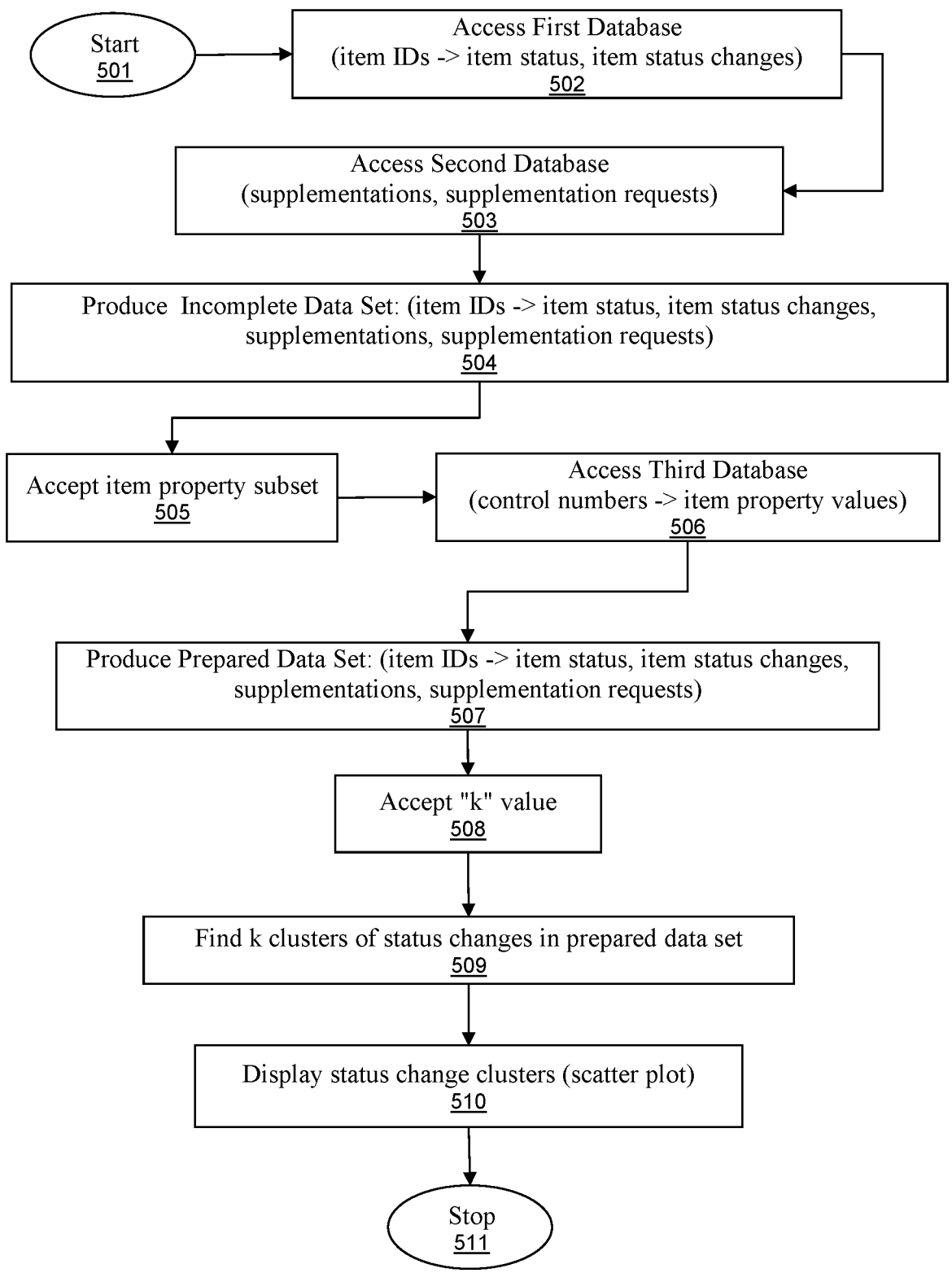
FIG. 5 illustrates a high level flow diagram of finding and displaying k clusters of historical or current collection data in accordance with aspects of the embodiments.

FIG. 5 illustrates a high level flow diagram of finding and displaying k clusters of historical or current collection data in accordance with aspects of the embodiments. After starting 501 a first data base is accessed 502 and then a second database is accessed 503. An incomplete data set is produced 504 using data from the first and second databases and associating item identifiers with item status, item status changes, supplementations, supplementation requests, etc. An analyst provides an item property subset 505 that is used in conjunction with data from a third database 506 to produce a prepared data set 507 from the incomplete data set. The analyst can provide an integer, k, 508 to be input into a clustering algorithm as the desired number of clusters. The prepared data set and k are provided to a clustering algorithm 509 to thereby obtain k clusters of status changes in the prepared data set. The clusters can be displayed to an analyst 510 before the process stops 511.

Figure 6:
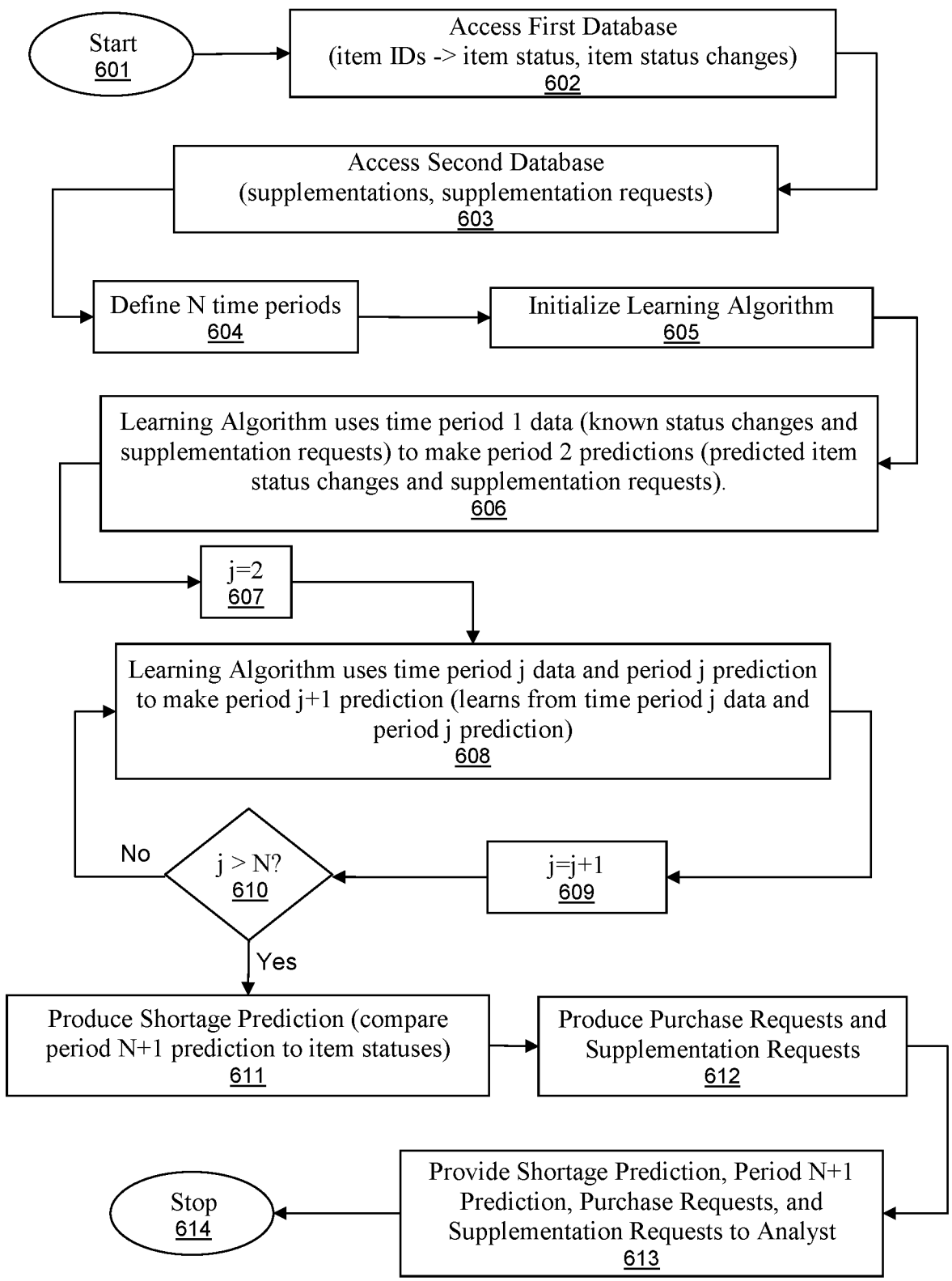
FIG. 6 illustrates a high level flow diagram of predicting future shortages based on historical and current collection data in accordance with aspects of the embodiments.

FIG. 6 illustrates a high level flow diagram of predicting future shortages based on historical and current collection data in accordance with aspects of the embodiments. After the start 601, first and second databases are accessed 602, 603 similarly to similar operations shown in FIG. 5. N time periods are defined 604 for which historical data is available. A learning algorithm is initialized 605 and uses time period 1 data (known status changes and supplementation requests) to make period 2 predictions (predicted item status changes and supplementation requests) 606. A counter, j, is set to 2 607. At block 608, the learning algorithm uses time period j data and the period j prediction to make a period j+1 prediction. In an attempt to improve accuracy, the learning algorithm can use the time period j data and the period j prediction to adjust itself before making the period j+1 prediction. The value of j is incremented 609 and then tested for j>N 610. If j is not greater than N, the process loops back to block 608 to make another prediction for another time period. If j>N, a shortage prediction for period N+1 is produced by comparing the period N+1 prediction to the item statuses of items in the collection 611. Purchase orders or supplementation requests can be automatically produced wherein, if approved, the related purchase or borrowings would alleviate the predicted shortage 612. The shortage prediction, purchase orders, supplementation requests, and period N+1 prediction can be supplied to an analyst 613 before the process stops 614.

Figure 7:
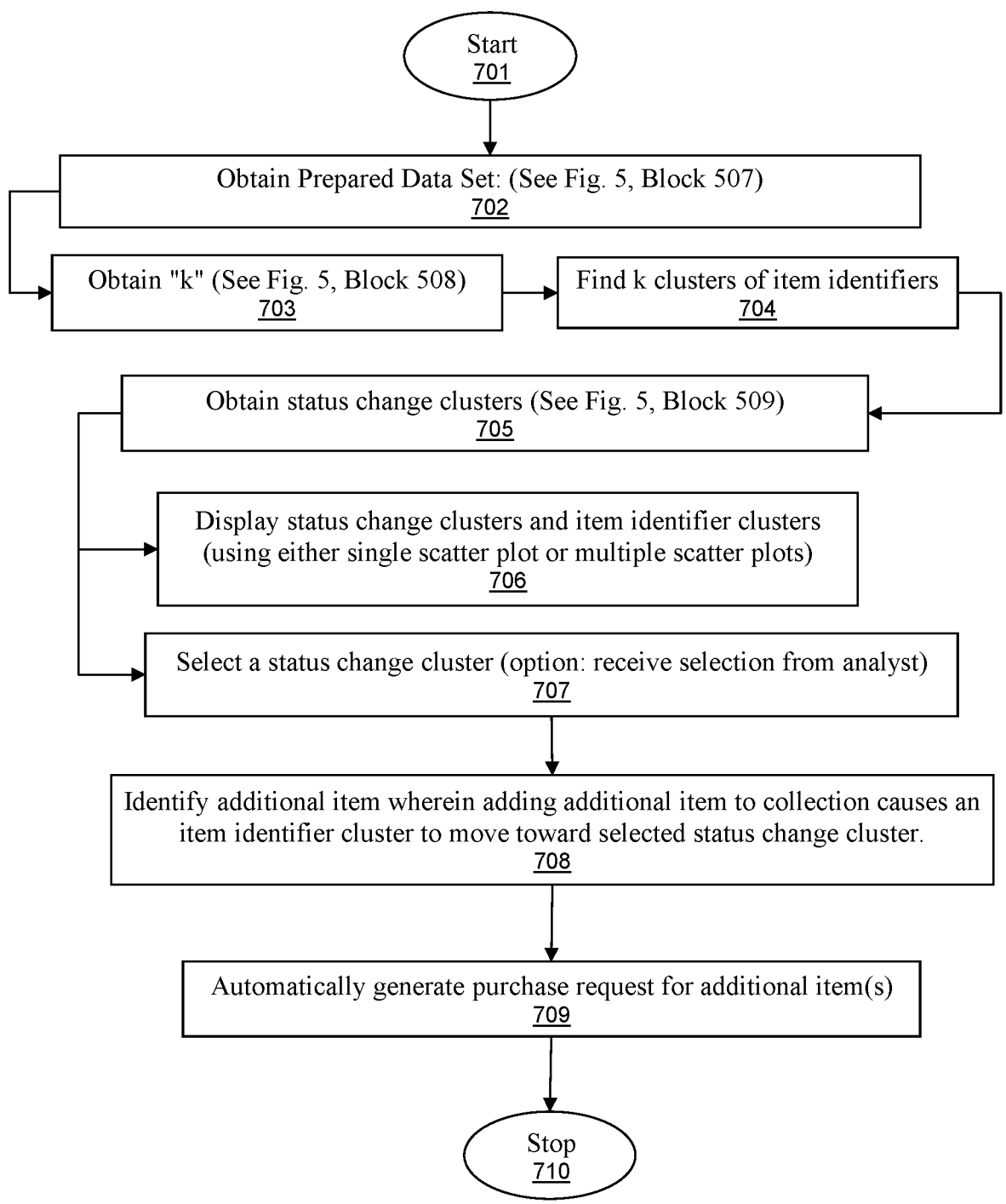
FIG. 7 illustrates a high level flow diagram of comparing clusters of data to thereby refine the collection based on user activity in accordance with aspects of the embodiments.

FIG. 7 illustrates a high level flow diagram of comparing clusters of data to thereby refine the collection based on user activity in accordance with aspects of the embodiments. After the start 701, a prepared data set is obtained 702 similarly to that produced at block 507 of FIG. 5. As in FIG. 5 block 508, an integer, k, is obtained 703 for input into a clustering algorithm as the desired number of clusters. The prepared data set and k are provided to a clustering algorithm 704 to thereby obtain k clusters of item identifiers in the prepared data set. Status change clusters are obtained 705, such clusters are produced at FIG. 5, block 509. The status change clusters and item identifier clusters can be displayed 706 to an analyst on a single scatter plot wherein the two types are clusters ae easily distinguishable. For example, the status change clusters can use a particular symbol or color while the item descriptor clusters use a different symbol or different color. A status change cluster can be selected 707 algorithmically or by the analyst. Algorithmic selection can occur by selecting each of the clusters in turn, selecting the most closely grouped cluster (smallest e.g. smallest average distance from cluster mean or similar metric), or selecting the cluster whose mean is closest to any one of the item identifier clusters or a particular one of the item clusters. An additional item is identified wherein adding the additional item to the collection would cause an item identifier cluster to move toward the selected status change cluster 708. The additional item can be found by searching the first database, second database, or third database. The movement of one cluster toward another can be determined by measuring the distance between the cluster means before and after the additional item is added to the item identifier cluster. A purchase request of loan request for the identified additional items can be automatically generated 710 such that the analyst or another person can approve the request for the item. Information such as the scatter plots, cluster means, and movement of cluster means can be provided along with the purchase/loan request such that the approval can be fully informed.

Figure 8:
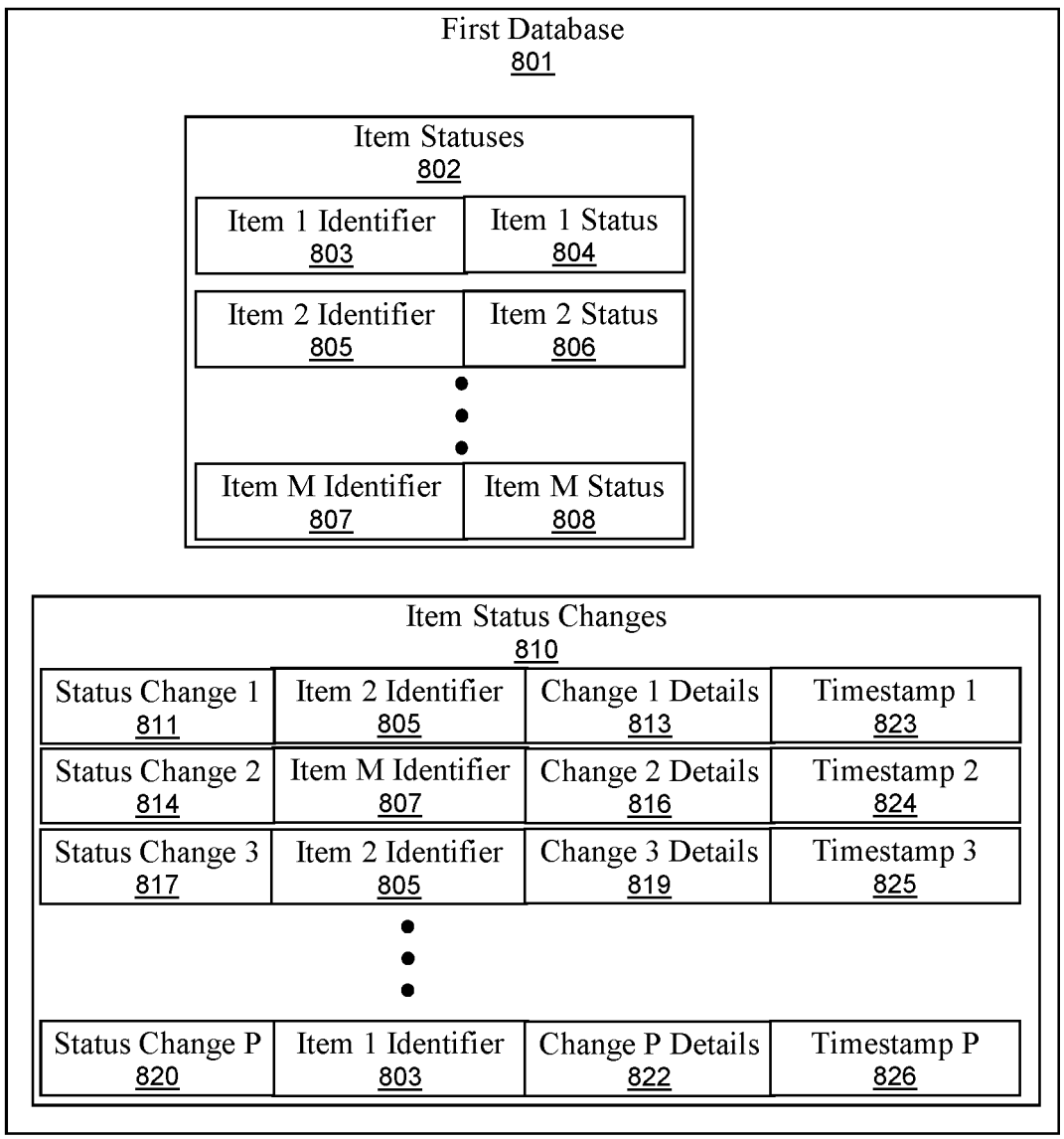
FIG. 8 illustrates an example of a first database having records in accordance with aspects of the embodiments.

FIG. 8 illustrates an example of a first database 801 having records in accordance with aspects of the embodiments. The first database 801 is illustrated as storing M item statuses 802 and P item status changes 810. M and P are integers. The item statuses 801 can associate item identifiers with the status of that item. Item identifier 1 803 is shown associated with item status 1 804. Item identifier 2 805 is shown associated with item status 2 806. Item identifier M 807 is shown associated with item status M 808. The item statuses changes 810 can associate status changes with item identifiers, change details, and timestamps. The item identifier can uniquely identify a specific item (e.g. a book) or can non-uniquely identify identical items (e.g. 5 copies of a book). The change details can indicate the new status and the event that caused the status change (e.g. book checked out/returned/loaned/shelved/etc.). The timestamp can indicate when the status changed. Status change 1 811 is shown associated with item 2 identifier 805, change 1 details 813, and timestamp 1 823. Status change 2 814 is shown associated with item M identifier 807, change 2 details 816, and timestamp 2 824. Status change 3 817 is shown associated with item 2 identifier 805, change 3 details 819, and timestamp 3 825. Status change P 820 is shown associated with item 1 identifier 803, change P details 822, and timestamp P 826. Note that status change 1 811 and status change 3 817 are related to different status changes for the item 2 as indicated by the item 2 identifier 805.

Figure 9:
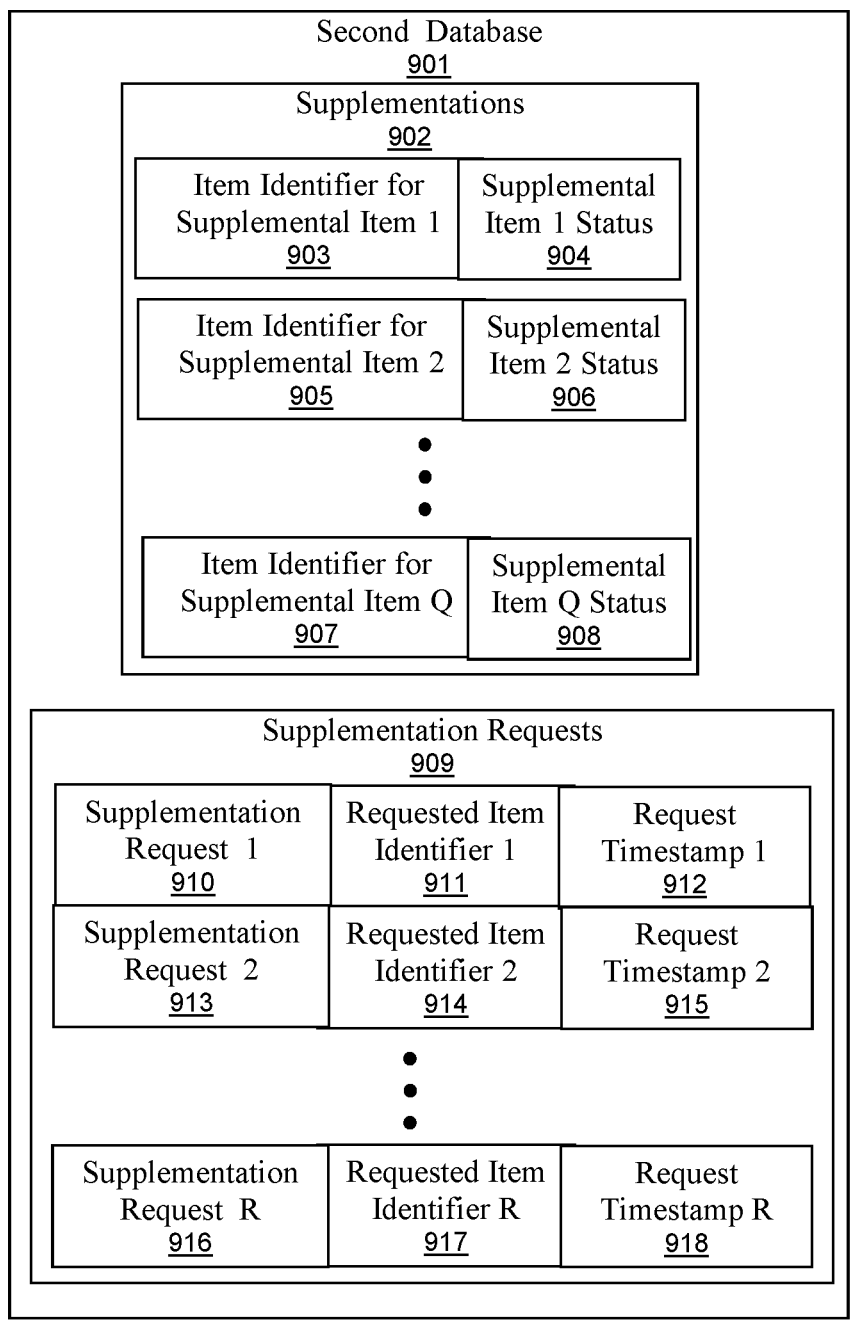
FIG. 9 illustrates an example of a second database having records in accordance with aspects of the embodiments.

FIG. 9 illustrates an example of a second database 901 having records in accordance with aspects of the embodiments. The second database 901 is illustrated as storing Q supplementations 902 and R supplementation requests 909. Q and R are integers. The supplementations 902 can associate item identifiers for supplemental items (e.g. books borrowed from other library) with the statuses of those supplemental items. Item identifier for supplemental item 1 903 is shown associated with supplemental item 1 status 904. Item identifier for supplemental item 2 905 is shown associated with supplemental item 2 status 906. Item identifier for supplemental item Q 907 is shown associated with supplemental item Q status 908.

The supplementation requests 909 can associate supplementation requests with requested item identifiers and request timestamps. Supplementation requests are requests to borrow items from cooperating collections (e.g. requests to borrow books from other libraries). The request timestamp indicates when the supplementation request for an item was made. Supplementation request 1 910 is shown associated with requested item identifier 1 911 and request timestamp 1. Supplementation request 2 910 is shown associated with requested item identifier 2 911 and request timestamp 2. Supplementation request R 910 is shown associated with requested item identifier R 911 and request timestamp R.

FIG. 10 illustrates an example of a third database 1001 having records in accordance with aspects of the embodiments. The third database 1001 is illustrated as storing S control numbers 1002 with a first property 1003 and a second property 1004. S is an integer. The control numbers identify things with their properties but do not necessarily identify specific items in a collection. Item identifiers can identify specific items in a collection. In general, an item identifier (e.g. identifying specific copy of book) can be mapped to a control number (e.g. reference number associated with all copies of the book). For example an OCLC (Online Computer Library Center) call number identifies books by title, version, etc. but does not identify a specific physical copy of a book. An item identifier can identify a specific physical copy of a book in a library. An item has properties such as title, pages, author, binding, etc. A property can have a value such as the title (a property) of a book (item) is "Catcher in the Rye" (property value). A collection such as a library can consult a database such as the OCLC database to determine the property values for the specific items in the collection.

The control numbers 1002 and properties 1003, 1004 are illustrated as a table although other data structures and storage formats can be used for associating properties with control numbers (e.g. JSON, XML, NoSQL, CSV files, etc.) Control number 1 1005 is shown associated with "control number 1, property 1 value" 1006 and "control number 1, property 1 value" 1007. "Control number 1, property 1 value" 1006 is simply the value of property 1 for control number 1. For example, a book having control number 1 has title (property 1) "Catcher in the Rye" (control number 1, property 1 value). Control number 2 1008 is shown associated with "control number 2, property 1 value" 1009 and "control number 2, property 1 value" 1010. Control number S 1011 is shown associated with "control number S, property 1 value" 1012 and "control number S, property 1 value" 1013.

FIG. 11 provides a table of book genres and subjects in accordance with aspects of the embodiments. The first column provides OCLC numbers which are unique to each publication. There are six "genre" columns indicating that this data set has up to six different values for the "genre" organizing variable. There are eight "subject" columns indicating that this data set has up to eight different values for the "subject" organizing variable.

FIG. 12 provides a table of collection data in accordance with aspects of the embodiments. The columns labels (top row), from left to right, are: OCLC Number; Format (e.g. Book, Print); Shared By; Title; Author; Publication Date; Edition; ISSN; ISBN; LCCN; Language (e.g. English); Physical description (e.g. number of pages); Series Statement; Genre; Audience (e.g. Adult); URI; LC Call Number; Dewey Call Number; Local Call Number; Location; Number of Circulations; and Last Circulated Date. Those familiar with the library sciences are also familiar with the data fields indicated by the column labels.

FIG. 13 provides a list of genres in accordance with aspects of the embodiments. The table provides a sampling of typical genres in its single column Those familiar with the library sciences are also familiar with genres and the data fields indicative of genres.

FIGS. 14a-14b provide a table of interlibrary loan (ILL) data in accordance with aspects of the embodiments. The table does not show actual ILL data but instead provides examples of entries having different values for the various data fields. Those familiar with the library sciences are also familiar with the data fields indicated by the column labels.

FIGS. 15a-15c provide a table of prediction data in accordance with aspects of the embodiments. The table provides an exemplary output of a shortage predictor such as that illustrated in FIG. 6. The columns, from left to right are labeled: Year; ESPN Number; Loan Title; Predicted Spring Requests, Spring Confidence; Spring Genre Weight; Predicted Summer Requests, Summer Confidence; Summer Genre Weight; Predicted Fall Requests, Fall Confidence; Fall Genre Weight; and Predicted Year Requests. The remaining columns are weekly breakdowns of the predicted requests; eight such columns are shown whereas fifty two columns can be provided. As can be seen, the shortage predictor is starting at an initial year for each title and proceeds to make predictions as described in this disclosure. Note that different titles can have different initial years based, for example, on acquisition date, first check out date, etc. The spring/summer/fall predictions are given as ranges with a confidence indicating a predicted likelihood the actual number of requests will fall within the range.

Note that the aforementioned mapping, transforming, clustering, initializing, preparing, and/or generating steps/ operations together (or individually) can lead to efficiencies (e.g., such as in speed, processing times, memory management, and so on) not only in forecasting but also in the underlying computing technology itself (e.g., computer processing speed, processing time, computer memory management, and so on). That is, improvements in forecasting efficiencies performed by a computer can result in improvements in efficiencies of the underlying computer technology used to make such forecasts. For example, an improved time involved in forecasting operations, producing a complete data set, and mappings based on one or more independent variables means faster processing time and power savings in the underlying computing technology such as the data-processing system discussed previously herein.

The database examples shown here are presented to illustrate aspects of the embodiments and are not intended to be limiting.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:

1. A method for managing a collection, wherein the collection comprises a plurality of items, the method comprising:
accessing a first database, wherein the first database is configured for storing a plurality of item statuses and a plurality of item status changes, wherein the item statuses and the item status changes are stored in association with a plurality of item identifiers, and wherein the item identifiers identify the items;
accessing a second database wherein the second database is configured for recording a plurality of supplementations and a plurality of supplementation requests, wherein the supplementations comprise at least one supplementation, wherein the supplementation requests comprise at least one supplementation request, wherein each supplementation is a temporary transfer of a shared item into the collection, and wherein fulfilling one of the supplementation requests results in at least one of the supplementations;

producing an incomplete data set associating the item identifiers to the item statuses, item status changes, supplementations, and supplementation requests;

accessing a third database, wherein the third database is configured for storing a plurality of control numbers in association with a plurality of item property values, wherein the control numbers are related to or identical to the item identifiers, wherein each item property value relates to one of a plurality of item properties;

accepting from an analyst an item property subset that is a proper subset of the item properties, wherein the item property subset comprises a plurality of selected item properties;

producing a prepared data set associating the item identifiers to the item statuses, the item status changes, the supplementations, the supplementation requests, and the selected item properties;

accepting from the analyst a k value, wherein k is an integral value that indicates the number of clusters to be identified by a k-means clustering algorithm;

using the k-means clustering algorithm to find k clusters of status changes within the prepared data set; and displaying to the analyst the k-clusters of status changes.

2. The method of claim 1 further comprising:
using the k-means clustering algorithm to find k clusters of item identifiers; and
displaying to the analyst the k-clusters of item identifiers.

3. The method of claim 2 wherein displaying the k-clusters of status changes and the k-clusters of item identifiers comprises producing at least one scatter plot.

4. The method of claim 2 further comprising automatically generating at least one purchase request for an additional item wherein adding the additional item to the collection causes one of the k-clusters of item identifiers to move toward one of the k-clusters of status changes.

5. The method of claim 2 further comprising:
defining N time periods comprising a time period 1, a time period 2, and a time period N, wherein N is an integer greater than three;
causing an initial learning algorithm to produce a period 2 predictions based on the item status changes and supplementation requests occurring during the time period 1;
for integral values of j ranging from 2 to N, causing a learning algorithm to produce a period (j+1) prediction based on a period j prediction and on the item status changes and supplementation requests that occurred during the time period j, wherein the period N+1 prediction is produced when j equals N;
producing a shortage prediction by comparing the period N+1 prediction to the item statuses; and
providing the period N+1 prediction and the shortage prediction to an analyst.

6. The method of claim 1 wherein the collection is a library and wherein the items comprise books, periodicals, treatises, dissertations, and theses.

7. The method of claim 1 wherein the collection is a library, wherein the supplementation requests are interlibrary loan requests and wherein each supplementation is a temporary transfer of a book, a periodical, a treatise, a dissertation, or a thesis to the library.

8. A method for managing a collection, wherein the collection comprises a plurality of items, the method comprising:
accessing a first database, wherein the first database is configured for storing a plurality item statuses and a plurality of item status changes, wherein the item statuses and the item status changes are stored in association with a plurality of item identifiers, and wherein the item identifiers identify the items;
accessing a second database wherein the second database is configured for recording a plurality of supplementations and a plurality of supplementation requests, wherein the supplementations comprise at least one supplementation, wherein the supplementation requests comprise at least one supplementation request, wherein each supplementation is a temporary transfer of a shared item into the collection, and wherein fulfilling one of the supplementation requests results in at least one of the supplementations;
defining N time periods comprising a time period 1, a time period 2, and a time period N, wherein N is an integer greater than three;
causing an initial learning algorithm to produce a period 2 predictions based on the item status changes and supplementation requests occurring during the time period 1;
for integral values of j ranging from 2 to N, causing a learning algorithm to produce a period (j+1) prediction based on a period j prediction and on the item status changes and supplementation requests that occurred during the time period j, wherein the period N+1 prediction is produced when j equals N;
producing a shortage prediction by comparing the period N+1 prediction to the item statuses; and
providing the period N+1 prediction and the shortage prediction to an analyst.

9. The method of claim 8 further comprising:
producing an incomplete data set associating the item identifiers to the item statuses, item status changes, supplementations, and supplementation requests;
accessing a third database, wherein the third database is configured for storing a plurality of control numbers in association with a plurality of item property values, wherein the control numbers are related to or identical to the item identifiers, wherein each item property value relates to one of a plurality of item properties;
accepting from the analyst an item property subset that is a proper subset of the item properties, wherein the item property subset comprises a plurality of selected item properties;
producing a prepared data set associating the item identifiers to the item statuses, the item status changes, the supplementations, the supplementation requests, and the selected item properties;
accepting from the analyst a k value, wherein k is an integral value that indicates the number of clusters to be identified by a k-means clustering algorithm;
using the k-means clustering algorithm to find k clusters of status changes within the prepared data set; and
displaying to the analyst the k-clusters of status changes.

10. The method of claim 9 further comprising:
using the k-means clustering algorithm to find k clusters of item identifiers; and
displaying to the analyst the k-clusters of item identifiers and the k-clusters of status changes in a single presentation.

11. The method of claim 10 wherein displaying the k-clusters of status changes and the k-clusters of item identifiers comprises producing at least one scatter plot.

12. The method of claim 11 further comprising automatically generating at least one purchase request for an additional item wherein adding the additional item to the collection causes one of the k-clusters of item identifiers to move toward one of the k-clusters of status changes.

13. The method of claim 11 further comprising automatically generating at least one purchase request for an additional item wherein adding the additional item to the collection reduces the prediction shortage and causes one of the k-clusters of item identifiers to move toward one of the k-clusters of status changes.

14. The method of claim 11 further comprising automatically generating at least one supplementation request for an additional item wherein adding the additional item to the collection reduces the shortage prediction.

15. A non-transitory computer-usable medium embodying computer program code for managing a collection comprising a plurality of items, the computer program code comprising computer executable instructions configured for:
  accessing a first database, wherein the first database is configured for storing a plurality item statuses and a plurality of item status changes, wherein the item statuses and the item status changes are stored in association with a plurality of item identifiers, and wherein the item identifiers identify the items;
  accessing a second database wherein the second database is configured for recording a plurality of supplementations and a plurality of supplementation requests, wherein the supplementations comprise at least one supplementation, wherein the supplementation requests comprise at least one supplementation request, wherein each supplementation is a temporary transfer of a shared item into the collection, and wherein fulfilling one of the supplementation requests results in at least one of the supplementations;
  defining N time periods comprising a time period 1, a time period 2, and a time period N, wherein N is an integer greater than three;
  causing an initial learning algorithm to produce a period 2 predictions based on the item status changes and supplementation requests occurring during the time period 1;
  for integral values of j ranging from 2 to N, causing a learning algorithm to produce a period (j+1) prediction based on a period j prediction and on the item status changes and supplementation requests that occurred during the time period j, wherein the period N+1 prediction is produced when j equals N;
  producing a shortage prediction by comparing the period N+1 prediction to the item statuses; and
  providing the period N+1 prediction and the shortage prediction to an analyst.

16. The non-transitory computer-usable medium of claim 15 further comprising computer executable instructions configured for:
  producing an incomplete data set associating the item identifiers to the item statuses, item status changes, supplementations, and supplementation requests;
  accessing a third database, wherein the third database is configured for storing a plurality of control numbers in association with a plurality of item property values, wherein the control numbers are related to or identical to the item identifiers, wherein each item property value relates to one of a plurality of item properties;
  accepting from the analyst an item property subset that is a proper subset of the item properties, wherein the item property subset comprises a plurality of selected item properties;
  producing a prepared data set associating the item identifiers to the item statuses, the item status changes, the supplementations, the supplementation requests, and the selected item properties;
  accepting from the analyst a k value, wherein k is an integral value that indicates the number of clusters to be identified by a k-means clustering algorithm;
  using the k-means clustering algorithm to find k clusters of status changes within the prepared data set; and
  displaying to the analyst the k-clusters of status changes.

17. The non-transitory computer-usable medium of claim 16 further comprising computer executable instructions configured for:
  using the k-means clustering algorithm to find k clusters of item identifiers; and
  displaying to the analyst the k-clusters of item identifiers and the k-clusters of status changes in a single scatter plot wherein the k-clusters of status changes are distinguished from the k-clusters of item identifiers.

18. The non-transitory computer-usable medium of claim 16 further comprising computer executable instructions configured for: automatically generating at least one supplementation request for an additional item, wherein the additional item is received, and wherein adding the additional item to the collection reduces a shortage predicted by the shortage prediction.

19. The non-transitory computer-usable medium of claim 16, wherein:
  the collection is a library;
  the items comprise books, periodicals, treatises, dissertations, and theses;
  the supplementation requests are interlibrary loan requests; and
  each supplementation is a temporary transfer of a book, a periodical, a treatise, a dissertation, or a thesis to the library.

20. The non-transitory computer-usable medium of claim 19 further comprising computer executable instructions configured for:
  automatically generating at least one purchase request for an additional book, wherein the book is received, wherein adding the additional book to the library causes one of the k-clusters of item identifiers to move toward one of the k-clusters of status changes.

* * * * *